United States Patent
Nagahiro et al.

(10) Patent No.: US 11,140,307 B2
(45) Date of Patent: Oct. 5, 2021

(54) INFORMATION PROCESSING METHOD AND PROGRAM THAT SWITCHES BETWEEN A FIRST COMMUNICATION PATH AND A SECOND COMMUNICATION PATH DURING CAPTURING AN IMAGE BY AN IMAGE PICKUP APPARATUS

(71) Applicant: SONY CORPORATION, Tokyo (JP)

(72) Inventors: Koji Nagahiro, Kanagawa (JP); Yoshihiro Otsuka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/914,912

(22) Filed: Jun. 29, 2020

(65) Prior Publication Data

US 2020/0329190 A1    Oct. 15, 2020

Related U.S. Application Data

(63) Continuation of application No. 15/781,271, filed as application No. PCT/JP2016/082769 on Nov. 4, 2016, now Pat. No. 10,721,385.

(30) Foreign Application Priority Data

Dec. 22, 2015   (JP) .................. 2015-249609

(51) Int. Cl.
*H04N 5/232* (2006.01)
*G09G 5/00* (2006.01)
(Continued)

(52) U.S. Cl.
CPC ......... *H04N 5/23203* (2013.01); *G06F 1/163* (2013.01); *G06F 1/3206* (2013.01);
(Continued)

(58) Field of Classification Search
CPC .................. H04N 5/23203; H04N 5/232939
See application file for complete search history.

(56) References Cited

U.S. PATENT DOCUMENTS

| | | |
|---|---|---|
| 6,774,935 B1 | 8/2004 | Morimoto et al. |
| 7,650,144 B2 | 1/2010 | Nakamura et al. |

(Continued)

FOREIGN PATENT DOCUMENTS

| | | |
|---|---|---|
| CN | 1829317 A | 9/2006 |
| CN | 100492255 C | 5/2009 |

(Continued)

OTHER PUBLICATIONS

Office Action for JP Patent Application No. 2017-557773, dated Jun. 9, 2020, 05 pages of Office Action and 04 pages of English Translation.

(Continued)

*Primary Examiner* — Gary C Vieaux
(74) *Attorney, Agent, or Firm* — Chip Law Group

(57) ABSTRACT

Reduction in power consumption of a video camera and a remote controller that displays a captured image of the video camera and improvement of operability are achieved. In a system including the video camera and the remote controller that displays a captured image of the video camera, when a period in which there is no operation on the operation unit of the remote controller reaches a first prescribed time, transmission of the captured image from the video camera to the remote controller via Wi-Fi communication and displaying processing on a display unit of the remote controller are stopped. Further, when a period in which there is no operation on the operation unit of the remote controller reaches a second prescribed time, the Wi-Fi communication is interrupted. Valid operation unit information in each mode is displayed on the display unit of the remote controller.

20 Claims, 20 Drawing Sheets

(51) Int. Cl.
*G06F 1/16* (2006.01)
*H04N 7/18* (2006.01)
*G06F 1/3206* (2019.01)

(52) U.S. Cl.
CPC ............... *G09G 5/00* (2013.01); *H04N 5/232* (2013.01); *H04N 5/232935* (2018.08); *H04N 5/232939* (2018.08); *H04N 7/185* (2013.01); *G06F 2203/0384* (2013.01)

(56) References Cited

U.S. PATENT DOCUMENTS

| | | | |
|---|---|---|---|
| 9,247,119 | B2 | 1/2016 | Morisawa |
| 10,721,385 | B2 * | 7/2020 | Nagahiro ............... H04N 7/185 |
| 2004/0150724 | A1 | 8/2004 | Nozaki et al. |
| 2005/0289363 | A1 | 12/2005 | Tsirkel et al. |
| 2006/0209176 | A1 | 9/2006 | Nakamura et al. |
| 2007/0078552 | A1 | 4/2007 | Rosenberg |
| 2012/0293709 | A1 | 11/2012 | Hwang et al. |
| 2013/0135198 | A1 | 5/2013 | Hodge et al. |
| 2014/0073244 | A1 | 3/2014 | Ko et al. |
| 2014/0089709 | A1 | 3/2014 | Furuya et al. |
| 2015/0103235 | A1 | 4/2015 | Yoshizawa |

FOREIGN PATENT DOCUMENTS

| | | |
|---|---|---|
| CN | 101990061 A | 3/2011 |
| CN | 102842213 A | 12/2012 |
| CN | 104434008 A | 3/2015 |
| CN | 104580881 A | 4/2015 |
| EP | 1699028 A1 | 9/2006 |
| JP | 11-252488 A | 9/1999 |
| JP | 2000-333070 A | 11/2000 |
| JP | 2001-067160 A | 3/2001 |
| JP | 2002-208888 A | 7/2002 |
| JP | 2006-279927 A | 10/2006 |
| JP | 2015-076821 A | 4/2015 |
| JP | 2015-127920 A | 7/2015 |
| KR | 10-2006-0096909 A | 9/2006 |
| KR | 10-2015-0042704 A | 4/2015 |

OTHER PUBLICATIONS

International Search Report and Written Opinion of PCT Application No. PCT/JP2016/082769, dated Jan. 10, 2017, 06 pages of ISRWO and 12 pages English Translation.

Office Action for CN Patent Application No. 201680073734.X, dated Mar. 17, 2020, 13 pages of Office Action and 15 pages of English Translation.

International Preliminary Report on Patentability of PCT Application No. PCT/JP2016/082769, dated Jul. 5, 2018, 05 pages of IPRP and 10 pages English Translation.

Non-Final Office Action for U.S. Appl. No. 15/781,271, dated Sep. 18, 2019, 23 pages.

Notice of Allowance for U.S. Appl. No. 15/781,271, dated Jun. 23, 2020, 3 pages.

Notice of Allowance for JP Patent Application No. 2017-557773 dated May 25, 2021, 3 pages of Office Action and 2 pages of English Translation.

* cited by examiner

| No. | Icon | Meaning | Display pattern | |
|---|---|---|---|---|
| (1) |  | Wi-Fi connection information |  | Connection state |
| | | | | Non-connection state |
| (2) |  | Bluetooth (BT) connection information |  | Connection state |
| | | | | Non-connection state |
| (3) |  | Camera battery remaining amount information |  | Full remaining amount |
| | | |  | No remaining amount |
| (4) |  | Remote controller battery remaining amount information |  | Full remaining amount |
| | | |  | No remaining amount |

FIG.3

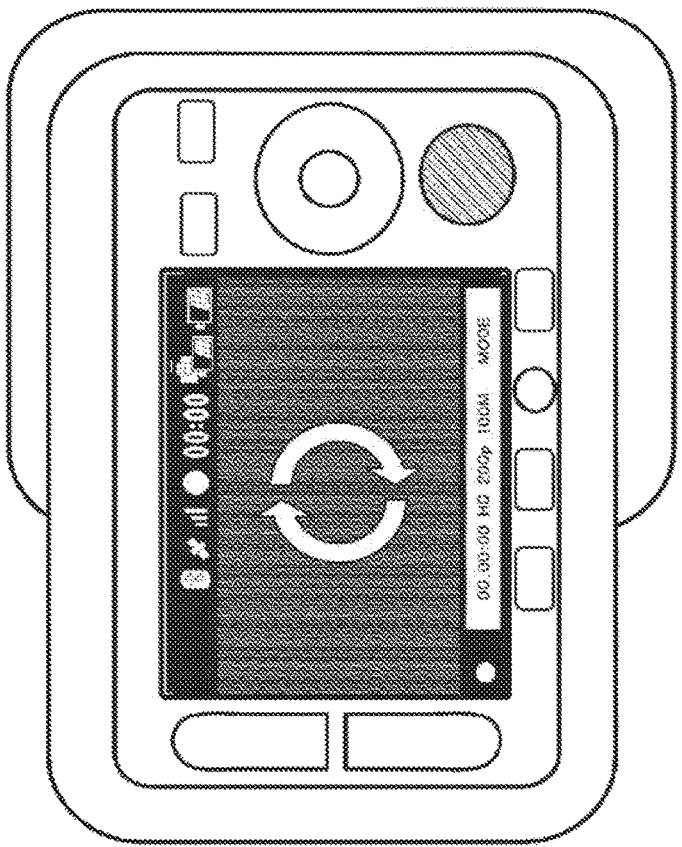
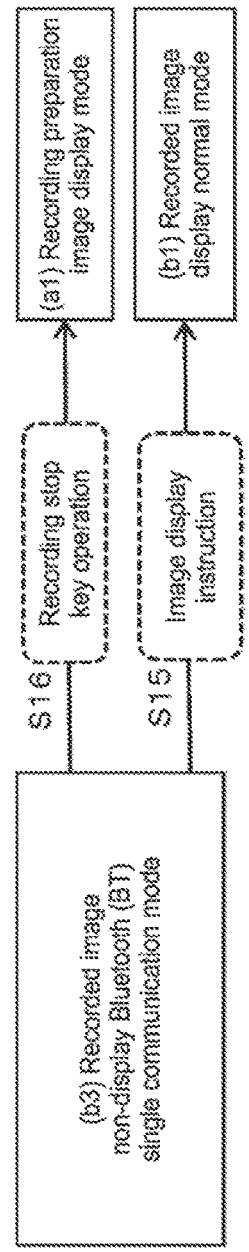
FIG.12

| Icon | Meaning | Display pattern | |
|---|---|---|---|
| (1) | Wi-Fi and Bluetooth (BT) connection information | Connection state | Non-connection state |
| (2) | Bluetooth (BT) connection information | Connection state | Non-connection state |
| (3) | GPS information | GPS available | GPS unavailable |
| (4) | Camera battery remaining amount information | Full remaining amount | No remaining amount |

FIG. 14

INFORMATION PROCESSING METHOD AND PROGRAM THAT SWITCHES BETWEEN A FIRST COMMUNICATION PATH AND A SECOND COMMUNICATION PATH DURING CAPTURING AN IMAGE BY AN IMAGE PICKUP APPARATUS

CROSS REFERENCE TO RELATED APPLICATIONS

This application is a continuation application of U.S. patent application Ser. No. 15/781,271, filed Jun. 4, 2018, which is a U.S. National Phase of International Patent Application No. PCT/JP2016/082769 filed on Nov. 4, 2016, which claims priority benefit of Japanese Patent Application No. JP 2015-249609 filed in the Japan Patent Office on Dec. 22, 2015. Each of the above-referenced applications is hereby incorporated herein by reference in its entirety.

TECHNICAL FIELD

The present disclosure relates to an information processing apparatus, an imaging apparatus, an information processing system, an information processing method, and a program. More specifically, the present disclosure relates to an information processing apparatus, an imaging apparatus, an information processing system, an information processing method, and a program that control image capturing processing or image display processing of a camera by the operation of a remote controller.

BACKGROUND ART

In recent years, a digital camera or digital video camera has been reduced in size and weight, and a camera having a communication function has been increasingly used and developed.

For example, there is a system in which a display for displaying images is provided to a remote controller capable of intercommunicating with a camera, start or stop of image capturing by the camera is controlled by an operation of the remote controller, and the captured image can be displayed on the display of the remote controller.

Note that examples of the existing techniques that disclose a system in which a camera operation is capable of being controlled by using a remote controller include Patent Literature 1 (Japanese Patent Application Laid-open No. 2015-127920).

In the system in which the camera is controlled by the remote controller, for example, an image captured by the camera is transferred to the remote controller and displayed on a display unit (display) on the remote controller side, so that a user as an operator of the remote controller can execute an instruction such as image recording start or stop processing.

Each of the camera and the remote controller is equipped with a battery (battery cell) and, with the power supply from the battery, executes various types of data processing such as image capturing processing, image display processing, and further communication processing between the remote controller and the camera.

However, image transfer, image display processing, and other types of data communication processing consume a large amount of power. Meanwhile, the capacitance of the battery mounted to the camera or the remote controller is limited, and reducing the power consumption as much as possible is demanded.

CITATION LIST

Patent Literature

Patent Literature 1: Japanese Patent Application Laid-open No. 2015-127920

DISCLOSURE OF INVENTION

Technical Problem

The present disclosure has been made, for example, in view of the problems described above. For example, it is an object of the present disclosure to provide an information processing apparatus, an imaging apparatus, an information processing system, an information processing method, and a program that achieve reduction in power consumption and also achieve an easy-to-understand user operation in a system in which the operation of a camera is controlled using a remote controller, for example.

Solution to Problem

A first aspect of the present disclosure is an information processing apparatus including: a communication unit that communicates with an imaging apparatus; an operation unit that inputs operation information for the imaging apparatus; a display unit that displays an image; and a controller unit that executes control of reception of a captured image from the imaging apparatus via the communication unit and display processing on the display unit, the controller unit controlling whether the captured image from the imaging apparatus is to be displayed on the display unit or not on the basis of an operation state of the operation unit during image capturing by the imaging apparatus.

Further, a second aspect of the present disclosure is an information processing system including: an imaging apparatus; and a remote controller that executes control of the imaging apparatus, the remote controller controlling whether a captured image from the imaging apparatus is to be displayed on a display unit or not on the basis of an operation state of an operation unit of the remote controller during image capturing by the imaging apparatus.

Furthermore, a third aspect of the present disclosure is an imaging apparatus including: an imaging unit that executes image capturing; a communication unit that selectively applies a plurality of different communication paths and executes communication with a remote controller; and a controller unit that interrupts part of the plurality of communication paths with the remote controller when an unoperated period in which there is no user operation on the remote controller reaches a prescribed time, the controller unit displaying one icon on the display unit when both of a first communication path and a second communication path are available with the remote controller, the icon indicating that both of the first communication path and the second communication path are available.

Furthermore, a fourth aspect of the present disclosure is an information processing method, which is executed by an information processing apparatus, the information processing apparatus including: a communication unit that communicates with an imaging apparatus; an operation unit that inputs operation information for the imaging apparatus; a display unit that displays an image; and a controller unit that executes control of reception of a captured image from the imaging apparatus via the communication unit and display processing on the display unit, the controller unit controlling whether the captured image from the imaging apparatus is to be displayed on the display unit or not on the basis of an operation state of the operation unit during image capturing by the imaging apparatus.

Furthermore, a fifth aspect of the present disclosure is a program, which causes an information processing apparatus to execute information processing, the information processing apparatus including a communication unit that communicates with an imaging apparatus, an operation unit that inputs operation information for the imaging apparatus, a display unit that displays an image, and a controller unit that executes control of reception of a captured image from the imaging apparatus via the communication unit and display processing on the display unit, the program causing the controller unit to control whether the captured image from the imaging apparatus is to be displayed on the display unit or not on the basis of an operation state of the operation unit during image capturing by the imaging apparatus.

Note that examples of the program of the present disclosure include a program that can be provided to an information processing apparatus or a computer system that is capable of executing various program codes, from a recording medium or a communication medium in a computer-readable format. Such a program is provided in a computer-readable format, and thus processing corresponding to the program is achieved on the information processing apparatus or the computer system.

Still other objects, features, and advantages of the present disclosure will become apparent in light of the following detailed description on the basis of the embodiments of the present disclosure to be described later or the accompanying drawings. Note that, the "system" in this specification refers to a logical collective configuration of a plurality of apparatuses, and those apparatuses having respective configurations are not necessarily provided in the same casing.

Advantageous Effects of Invention

According to the configuration of one embodiment of the present disclosure, reduction in power consumption and improvement in operability of a video camera and a remote controller that displays a captured image of the video camera are achieved.

Specifically, in a system including a video camera and a remote controller that displays a captured image of the video camera, when an unoperated period of an operation unit of the remote controller reaches a first prescribed time, the transmission of the captured image from the video camera to the remote controller via Wi-Fi communication and the display processing on a display unit of the remote controller are stopped. Further, when an unoperated period of the operation unit of the remote controller reaches a second prescribed time, the Wi-Fi communication is interrupted. On the display unit of the remote controller, valid operation unit information is displayed in each mode.

With this configuration, reduction in power consumption and improvement in operability of a video camera and a remote controller that displays a captured image of the video camera are achieved.

Note that the effects described in this specification are merely illustrative and are not restrictive, and any other effects may be produced.

BRIEF DESCRIPTION OF DRAWINGS

FIG. 3 is a diagram for describing icons that are the display data of the display unit of the remote controller.

FIG. 12 is a diagram for describing an example of the display data of the display unit of the remote controller.

FIG. 14 is a diagram for describing an example of the display data of the display unit of the video camera.

MODE(S) FOR CARRYING OUT THE INVENTION

Figure 1:
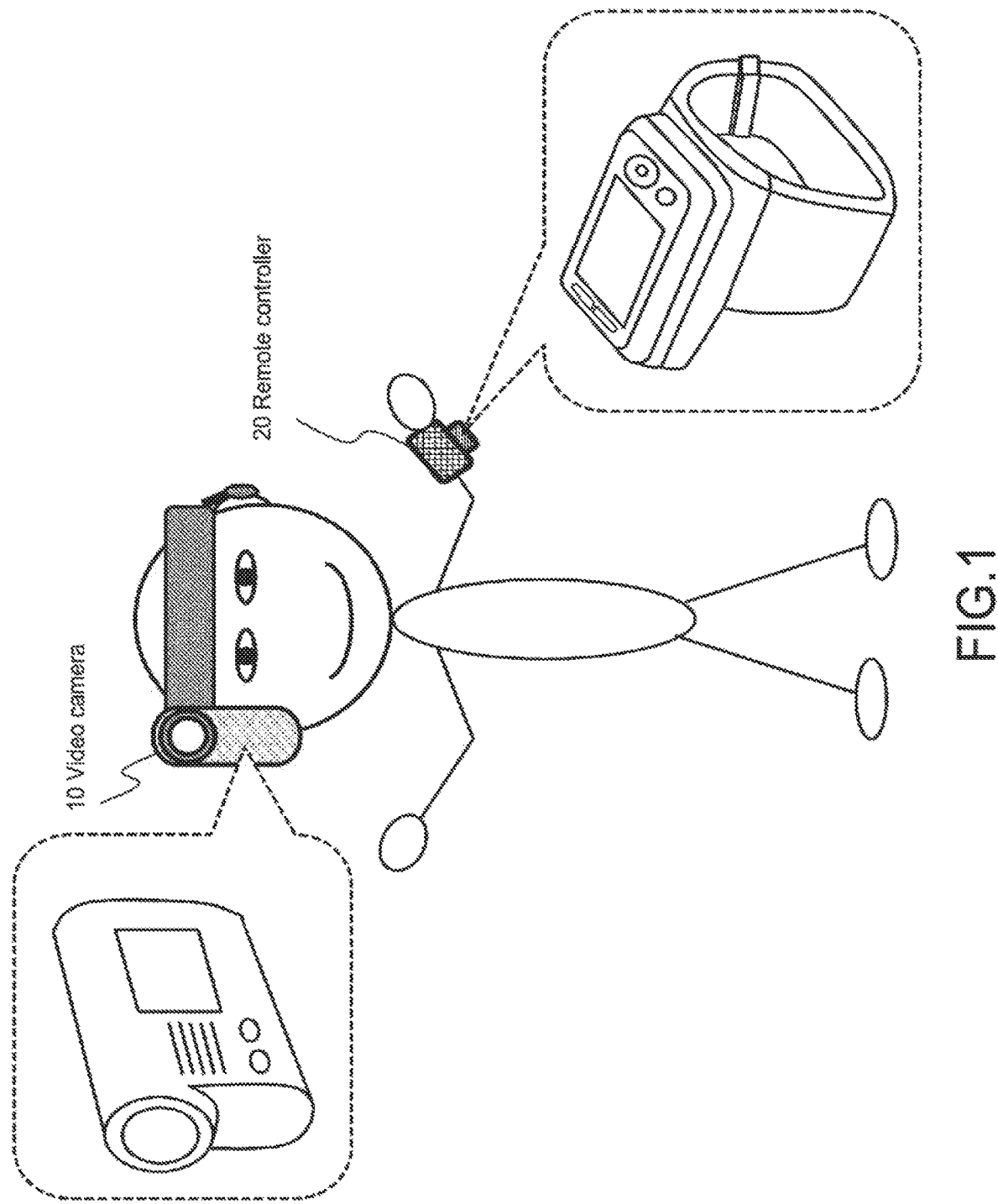
FIG. 1 is a diagram for describing a usage example of a video camera and a remote controller.

Hereinafter, an information processing apparatus, an imaging apparatus, an information processing system, an information processing method, and a program of the present disclosure will be described in detail with reference to the drawings. Note that description will be given in the following order.
1. Regarding configuration example of information processing system including camera operable with remote controller
2. Regarding Wi-Fi communication and Bluetooth (BT) communication
3. Regarding communication processing between video camera and remote controller and mode transition
4. Regarding state transition and mode transition in remote controller
5. Regarding configuration to display operable information in each mode on remote controller
6. Regarding display information on display unit of video camera 7. Regarding mode transition of remote controller and video camera and display information corresponding to mode
7-1. Regarding communication state, display information, and mode transition in (a1) recording preparation image display mode of (A) recording preparation state
7-2. Regarding communication state, display information, and mode transition in (b1) recorded image display normal mode of (B) recording execution state
7-3. Regarding communication state, display information, and mode transition in (b2) recorded image non-display stamina mode of (B) recording execution state
7-4. Regarding communication state, display information, and mode transition in (b3) recorded image non-display Bluetooth (BT) single communication mode of (B) recording execution state
8. Regarding change example of key setting of remote controller and of display information
9. Regarding other embodiments
10. Regarding configuration of information processing apparatus
11. Conclusion of configuration of present disclosure

1. Regarding Configuration Example of Information Processing System Including Camera Operable with Remote Controller First, description will be given on a configuration example of an information processing system including a camera operable with a remote controller.

FIG. 1 is a diagram showing a usage example of a camera operable with a remote controller.

Latest cameras or video cameras are increasingly reduced in size and weight. As shown in FIG. 1, if a user (videographer/photographer) wears such a camera or video camera so as to fix it to his/her body, e.g., head, the user can perform image capturing without feeling the weight of the camera so much.

However, if the user wears a video camera 10 on his/her head as shown in FIG. 1, it may be impossible for the user to operate an operation unit of the main body of the video camera 10 and see a display image on a display unit of the main body of the video camera 10.

Processing such as the start or stop of image capturing by the video camera 10 and confirmation of a captured image can be executed by using a remote controller 20 including a display unit (monitor), the remote controller 20 being mounted to an arm of the user shown in FIG. 1.

The video camera 10 and the remote controller 20 each include a communication unit that executes, for example, Wi-Fi communication or Bluetooth (BT (registered trademark)) communication, and has a configuration capable of transmitting and receiving images and various types of information such as operation information and state information (status) through mutual communication.

Figure 2:
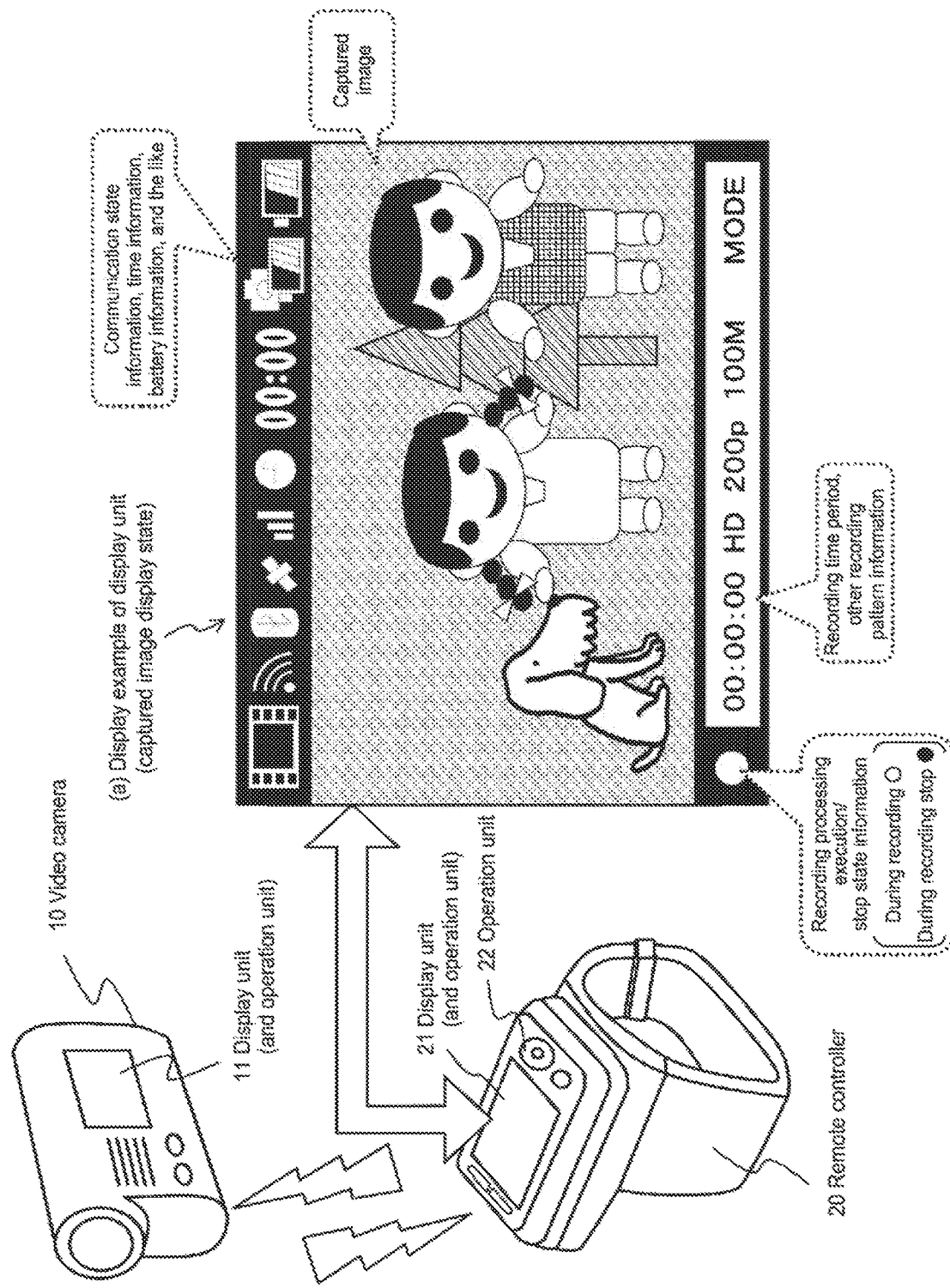
FIG. 2 is a diagram for describing an example of display data of a display unit of the remote controller.

FIG. 2 shows a configuration of the remote controller 20 and a display example of a display unit 21 of the remote controller 20.

As shown in FIG. 2, the remote controller 20 includes the display unit 21 and an operation unit 22. Note that the display unit 21 may have a configuration usable as a touch panel-type operation unit.

Note that the video camera 10 also includes a display unit 11, on which various types of information such as an image capturing execution state and a communication state are displayed.

The display information on the display unit 11 of the video camera 10 will be described later.

First, main display information displayed on the display unit 21 of the remote controller 20 will be described with reference to FIGS. 2 and 3.

For example, display data shown in (a) of FIG. 2 is displayed on the display unit 21 of the remote controller 20.

(a) of FIG. 2 shows a display example of the display unit 21, in which an image captured with the video camera 10 is displayed.

An image captured with the video camera 10 is displayed in the center region of the display unit. Note that an image captured via an imaging unit of the video camera 10 can be displayed on the display unit 21 irrespective of whether recording processing is in execution or under suspension.

The user (videographer/photographer) can control image capturing of the video camera 10, e.g., start or stop processing of recording processing or still image capturing, while observing a display image of the display unit 21. Those processing can be executed by operating the operation unit 22.

Operation information of the operation unit 22 is transmitted from the communication unit of the remote controller 20 to the communication unit of the video camera 10, and a controller unit of the video camera 10 executes processing corresponding to the received operation information.

Note that it is also possible to display UIs (user interfaces) including operation buttons or the like for those above operations on the display unit 21 of the remote controller 20 and to input instructions to start or stop image capturing and the like through operation (touch) or the like on those UIs.

Note that, as shown in (a) of FIG. 2, various types of information are displayed in the upper and lower display regions of the display unit 21 in addition to the captured image.

For example, in the upper region of the display unit 21, communication state information of each of Wi-Fi communication and Bluetooth (BT (registered trademark)) communication as communication state information with the video camera 10, time information, battery state information, and the like are displayed.

Further, in the lower region of the display unit 21, recording processing execution/stop state information, record time information, recorded image quality information, and other recording pattern information are displayed.

The example shown in the figure is an example in which a recording execution/stop identification lamp is used as the recording processing execution/stop state information. The recording execution/stop identification lamp is set to be turned on (white circle) during recording and to be turned off (black circle) during recording stop.

Display pattern examples of some icons displayed in the upper portion of the display example of the display unit 21 shown in (a) of FIG. 2 will be described with reference to FIG. 3.

FIG. 3 shows description regarding the following icons.
(1) Wi-Fi connection information
(2) Bluetooth (BT (registered trademark)) connection information
(3) Camera battery remaining amount information
(4) Remote controller battery remaining amount information Those are part of the icons displayed in the upper portion of the display unit 21 of the remote controller 20 shown in FIG. 2.

As shown in FIG. 3, the icon of (1) Wi-Fi connection information is set to be displayed in a Wi-Fi connection state where Wi-Fi communication is available between the remote controller 20 and the camera 10.

Meanwhile, in a Wi-Fi non-connection state where Wi-Fi communication is unavailable between the remote controller 20 and the camera 10, the icon is not displayed.

The same holds true for (2) Bluetooth (BT (registered trademark)) connection information. As shown in FIG. 3, the icon is set to be displayed in a Bluetooth (BT) connection state where Bluetooth (BT (registered trademark)) communication is available between the remote controller 20 and the camera 10.

Meanwhile, in a Bluetooth (BT) non-connection state where Bluetooth (BT) communication is unavailable between the remote controller 20 and the camera 10, the icon is not displayed.

(3) Camera battery remaining amount information is information indicating a battery remaining amount of a battery mounted to the video camera 10. As shown in FIG. 3, the display pattern of the battery-shaped icon is set to be changed on the basis of the battery remaining amount.

(4) Remote controller battery remaining amount information is information indicating a battery remaining amount of a battery mounted to the remote controller 20. As shown in FIG. 3, the display pattern of the battery-shaped icon is set to be changed on the basis of the battery remaining amount.

The remote controller 20 acquires information necessary for displaying those states, the information including remote controller related information and video camera related information. The remote controller 20 acquires the remote controller related information from the inside of the remote controller 20 and acquires the video camera related information on the basis of communication data from the video camera 10. The remote controller 20 receives the information on the video camera 10 through the Wi-Fi communication or the Bluetooth (BT) communication at any time, and performs display based on the received information.

Display examples of the display unit 21 of the remote controller 20 will be described with reference to FIGS. 4 and 5.

Figure 4:
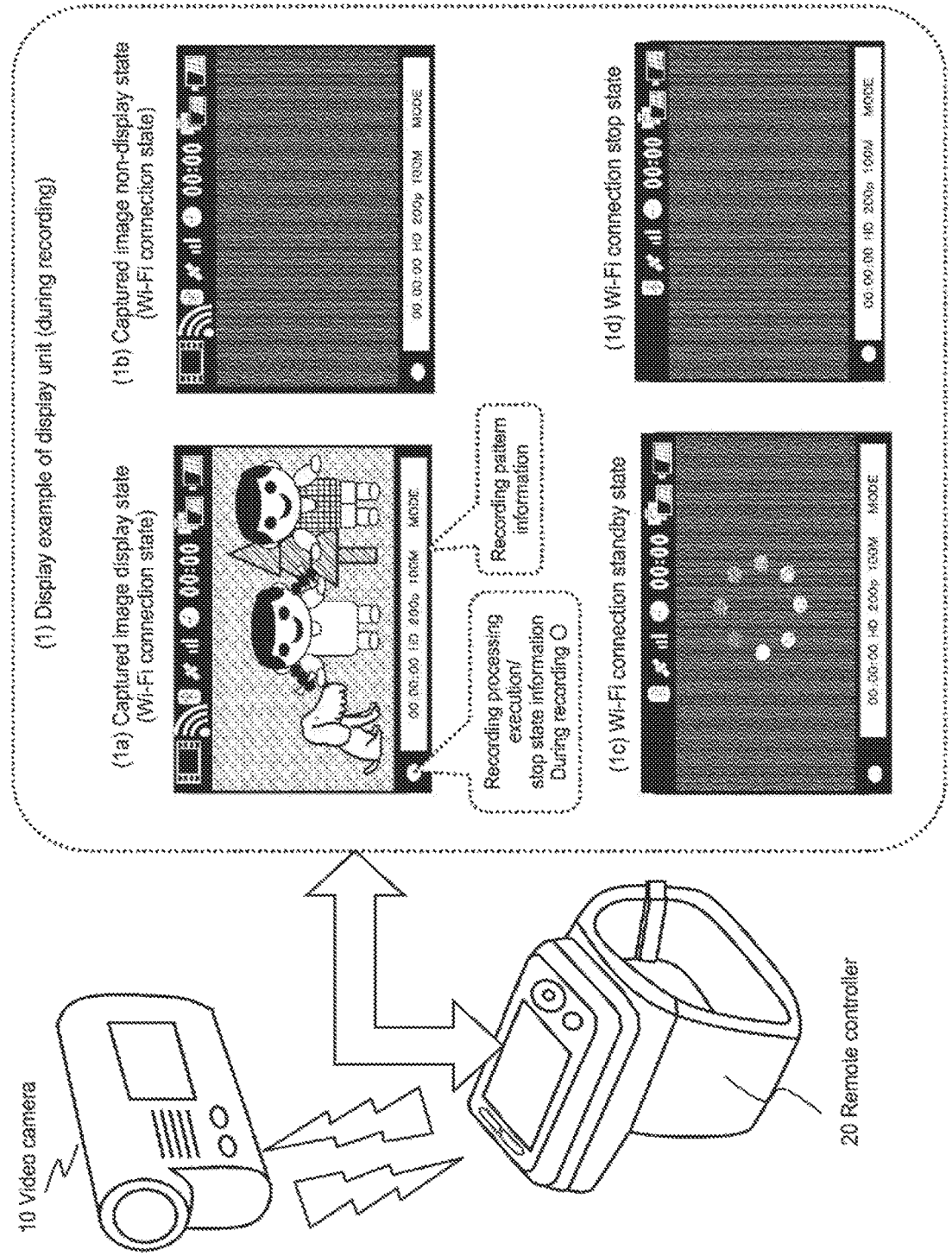
FIG. 4 is a diagram for describing an example of the display data of the display unit of the remote controller.

FIG. 4 shows a plurality of display examples of the display unit 21 of the remote controller 20 in a case where the recording processing is in execution in the video camera 10.

FIG. 4 shows the display examples of the following four states.

(1a) Captured-image display state (Wi-Fi connection state)
(1b) Captured image non-display state (Wi-Fi connection state)
(1c) Wi-Fi connection standby state
(1d) Wi-Fi connection stop state (1 a) Captured-image display state (Wi-Fi connection state) is a state where Wi-Fi connection is established between the video camera 10 and the remote controller 20, and a captured image (=recording processing image) of the video camera 10 is transmitted to the remote controller 20 through the Wi-Fi communication and displayed in the center region of the display unit 21 of the remote controller 20.

Further, in the lower portion of the display unit 21, the recording execution lamp is turned on and the recording pattern information is displayed.

In the upper portion of the display unit, a Wi-Fi connection icon and a Bluetooth (BT) connection icon are displayed. This indicates that both of the Wi-Fi connection and the BT connection between the video camera 10 and the remote controller 20 are valid, and the Wi-Fi communication and the BT communication are in execution.

(1b) Captured image non-display state (Wi-Fi connection state) is a state where Wi-Fi connection is established between the video camera 10 and the remote controller 20, but the transmission of a captured image (=recording processing image) of the video camera 10 to the remote controller 20 through the Wi-Fi communication is stopped. No image is displayed in the center region of the display unit 21 of the remote controller 20.

In the configuration of the present disclosure, in order to suppress power consumption, even if the recording processing by the video camera 10 is in execution, the transmission of the image from the video camera 10 to the remote controller 20 is stopped and image display processing in the remote controller 20 is stopped under prescribed conditions, e.g., when a state where the remote controller 20 is not operated by the user continues for a predetermined period.

By performing such image transmission stop processing and display stop processing, it is possible to suppress the consumption of the batteries mounted to the video camera 10 and the remote controller 20 and to achieve power saving.

The conditions for the image transmission stop processing, the display stop processing, and the like will be described in detail later.

Note that, also in this captured image non-display state, the recording execution lamp is turned on and the recording pattern information is displayed in the lower portion of the display unit 21.

In the upper portion of the display unit, the Wi-Fi connection icon and the Bluetooth (BT) connection icon are displayed. This indicates that both of the Wi-Fi connection and the BT connection between the video camera 10 and the remote controller 20 are valid, and the Wi-Fi communication and the BT communication are in execution.

On the basis of those pieces of information, the user can confirm that the recording is in execution or the communication is maintained, for example.

Note that when the user performs some kind of operation in "(1b) captured image non-display state (Wi-Fi connection state)", e.g., operates an operation unit of the remote controller 20 or performs a touch operation on the display unit 21 functioning as a touch panel, the remote controller 20 interprets this operation information as an image display request and outputs an image transmission request from the remote controller 20 to the video camera 10.

When receiving the request from the remote controller 20, the video camera 10 starts image transmission.

Through this processing, processing to transition from "(1b) captured image non-display state (Wi-Fi connection state)" shown in FIG. 4 to "(1 a) captured-image display state (Wi-Fi connection state)" shown in FIG. 4 is performed.

The series of transition processing will be described in detail later.

(1c) Wi-Fi connection standby state is a display example of the display unit 21, in which the Wi-Fi connection between the video camera 10 and the remote controller 20 is in an unconnected state but in a stage to shift to a connected state.

The Wi-Fi connection icon is not displayed.

It should be noted that the recording lamp is turned on, and the recording processing is continued.

In a case where the Wi-Fi connection is established in the (1c) state, the state transitions to "(1a) captured-image display state (Wi-Fi connection state)" shown in FIG. 4.

The display state of (1c) is a display example in a case where the Wi-Fi connection is temporarily interrupted during execution of the recording processing in the video camera 10.

In such a case, with the recording processing in the video camera 10 being continued, the Wi-Fi connection between the remote controller and the video camera is retried. When the connection is restored, the state transitions to "(1 a) captured-image display state (Wi-Fi connection state)" shown in FIG. 4, and the recording processing is continued as it is.

(1d) Wi-Fi connection stop state is a display example of the display unit 21, in which the Wi-Fi connection between the video camera 10 and the remote controller 20 is in an unconnected state and in a state where connection retry processing is also not performed.

The Wi-Fi connection icon is not displayed.

It should be noted that the recording lamp is turned on, and the recording processing is continued.

In the system of the present disclosure, a mode [Bluetooth (BT) single communication mode], in which the Wi-Fi communication between the video camera 10 and the remote controller 20 is voluntarily stopped and only the Bluetooth (BT) communication is continued, is set as one of power-saving modes.

In this [Bluetooth (BT) single communication mode], the Wi-Fi communication between the video camera 10 and the remote controller 20 is stopped, and transfer of the captured image via the Wi-Fi communication is also stopped.

In the configuration of the present disclosure, in order to suppress power consumption, even if the recording processing by the video camera 10 is in execution, the Wi-Fi communication between the video camera 10 and the remote controller 20 is stopped, the transfer of the captured image is also stopped, and minimum information is transmitted/received by using the Bluetooth (BT) communication under prescribed conditions, e.g., when a state where the remote controller is not operated by the user continues for a predetermined period. This mode is referred to as a Bluetooth (BT) single communication mode.

Using the Bluetooth (BT) single communication mode allows further suppression of consumption of the batteries mounted to the video camera 10 and the remote controller 20 and achieves further power saving.

This mode transition processing or the like will be described in detail later

Note that also in the Wi-Fi connection stop state shown in FIG. 4 (1d), the recording execution lamp is turned on and the recording pattern information is displayed in the lower portion of the display unit 21, so that the user can recognize that the recording processing is continued.

It should be noted that the Wi-Fi connection icon in the upper portion of the display unit is turned off, and the Bluetooth (BT) connection icon is displayed.

This indicates that between the video camera 10 and the remote controller 20, only the Bluetooth (BT) communication is valid, and the Wi-Fi communication is unavailable but the BT communication is in execution.

On the basis of those pieces of information, the user can confirm that the recording is in execution or a communication state.

Note that when the user performs some kind of operation in "(1d) Wi-Fi connection stop state", e.g., operates an operation unit of the remote controller 20 or performs a touch operation on the display unit 21 functioning as a touch panel, the remote controller 20 interprets this operation information as an image display request, executes restoration processing for the Wi-Fi connection between the remote controller 20 and the video camera 10, and further outputs an image transmission request to the video camera 10.

When receiving the request from the remote controller 20, the video camera 10 starts image transmission via the reconnected Wi-Fi communication path.

Through this processing, processing to transition from "(1d) Wi-Fi connection stop state" shown in FIG. 4 to "(1 a) captured-image display state (Wi-Fi connection state)" shown in FIG. 4 is performed.

The series of processing will be described in detail later.

Next, display examples in a case where the recording processing is not executed in the video camera 10 will be described as the display examples of the display unit 21 of the remote controller 20 with reference to FIG. 5.

Figure 5:
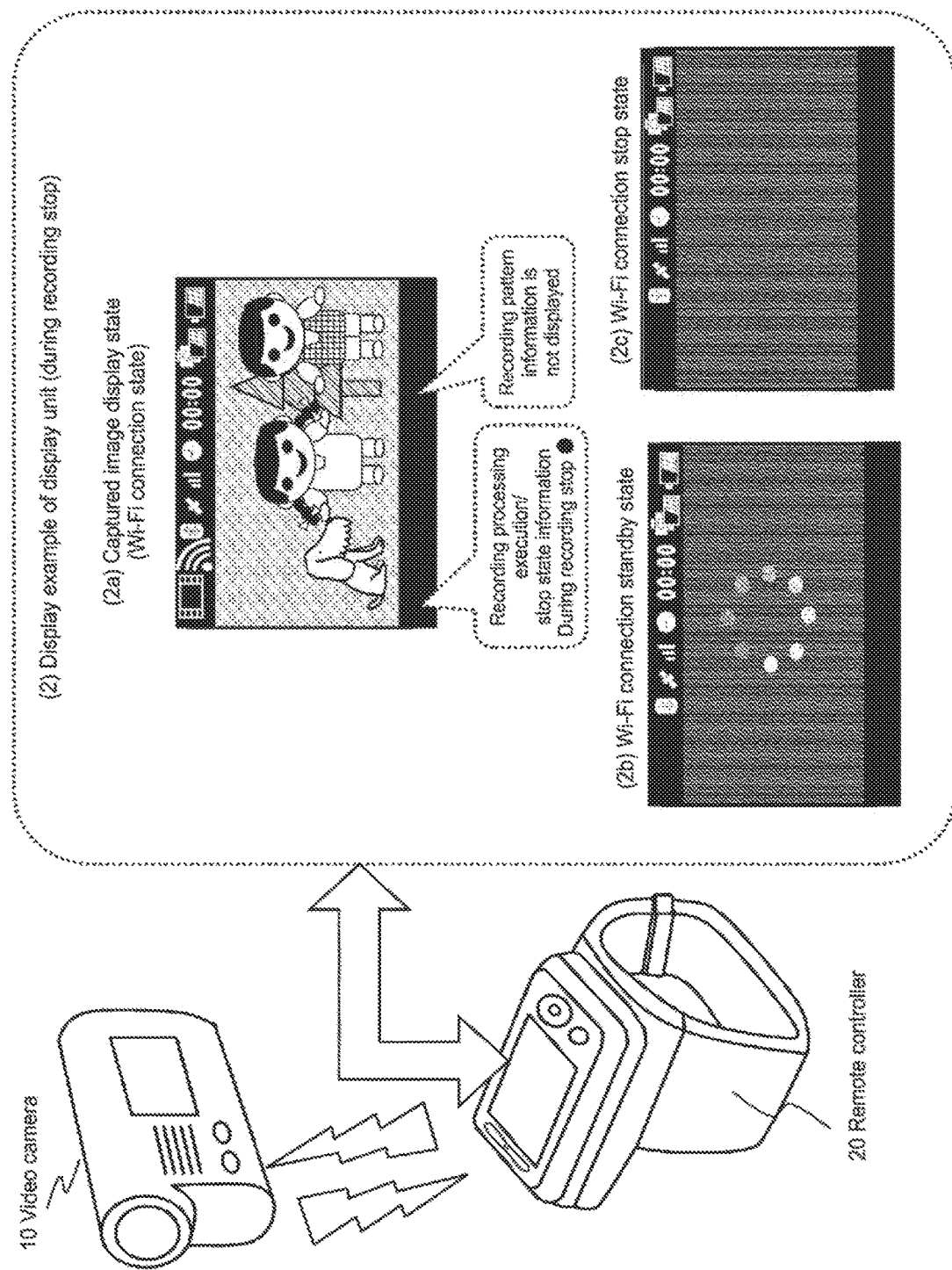
FIG. 5 is a diagram for describing an example of the display data of the display unit of the remote controller.

FIG. 5 shows a plurality of display examples of the display unit 21 of the remote controller 20 in a case where the recording processing is not executed in the video camera 10.

FIG. 5 shows the display examples of the following four states.

(2a) Captured-image display state (Wi-Fi connection state)
(2b) Wi-Fi connection standby state
(2c) Wi-Fi connection stop state Note that even in a case where the recording processing is not executed in the video camera 10, an image is captured via the imaging unit of the video camera 10, and this captured image is transmitted from the video camera 10 to the remote controller 20 as long as the video camera 10 is powered on.

In (2a) captured-image display state (Wi-Fi connection state), the Wi-Fi connection is established between the video camera 10 and the remote controller 20, and a captured image (on which recording processing is not performed) of the video camera 10 is transmitted to the remote controller 20 through the Wi-Fi communication and displayed in the center region of the display unit 21 of the remote controller 20.

However, in this case, the recording execution lamp in the lower portion of the display unit 21 is turned off, and the recording pattern information is also not displayed.

On the basis of those pieces of information, the user can recognize that the display image is not recorded.

In the upper portion of the display unit, the Wi-Fi connection icon and the Bluetooth (BT) connection icon are displayed. This indicates that both of the Wi-Fi connection and the BT connection between the video camera 10 and the remote controller 20 are valid, and the Wi-Fi communication and the BT communication are in execution.

(2b) Wi-Fi connection standby state is a display example of the display unit 21, in which the Wi-Fi connection between the video camera 10 and the remote controller 20 is in an unconnected state but in a stage to shift to a connected state.

The Wi-Fi connection icon is not displayed.

The recording lamp is turned off, and the recording processing is not performed.

In a case where the Wi-Fi connection is established in the (2b) state, the state transitions to "(2a) captured-image display state (Wi-Fi connection state)" shown in FIG. 5.

The display state of (2b) is a display example in a case where the Wi-Fi connection is temporarily interrupted when the captured image of (2a) of FIG. 5 is being displayed in the video camera 10, for example.

In such a case, with the recording processing in the video camera 10 being stopped, the Wi-Fi connection between the remote controller and the video camera is retried. When the connection is restored, the state transitions to "(2a) captured-image display state (Wi-Fi connection state)" shown in FIG. 5, and the captured image is displayed.

(2c) Wi-Fi connection stop state is a display example of the display unit 21, in which the Wi-Fi connection between the video camera 10 and the remote controller 20 is in an unconnected state and in a state where connection retry processing is also not performed.

The Wi-Fi connection icon is not displayed.

The recording lamp is also turned off, and the recording processing is not performed.

As described with reference to FIGS. 4 and 5, the display unit 21 of the remote controller 20 is changed to have various different display patterns on the basis of the states.

The display transition processing will be described in detail later.

2. Regarding Wi-Fi Communication and Bluetooth (BT) Communication

Next, the Wi-Fi communication and the Bluetooth (BT (registered trademark)) communication executed between the video camera 10 and the remote controller 20 will be described.

Figure 6:
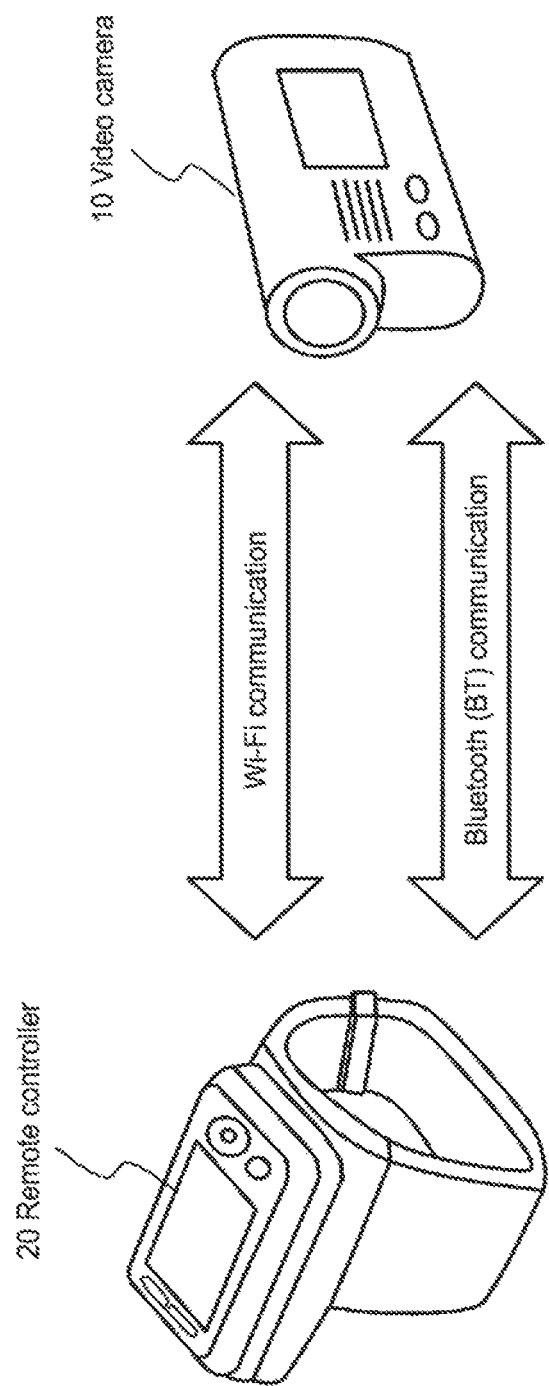
FIG. 6 is a diagram for describing an example of communication between the video camera and the remote controller.

As shown in FIG. 6, the video camera 10 and the remote controller 20 each include a communication unit, and the Wi-Fi communication and the Bluetooth (BT (registered trademark)) communication are executed via both of the communication units.

The Wi-Fi communication has a plurality of communication standards such as IEEE802.11a/b/g/n standards.

The Wi-Fi communication can be performed by selecting one of two bandwidths, 2.4 GHz and 5 GHz. The Wi-Fi communication has the characteristics of a wide available bandwidth, a relatively high communication speed, and a relatively long communicable distance (approximately 100 m), thus enabling stable communication of a large amount of data.

Meanwhile, the Bluetooth (BT (registered trademark)) communication has the characteristics of one type of available bandwidth, 2.4 GHz, a communication speed lower than that of Wi-Fi, and a communicable distance (approximately 10 m) shorter than that of Wi-Fi.

However, the Bluetooth (BT (registered trademark)) communication consumes less power than the Wi-Fi communication, which is advantageous.

Note that the Bluetooth (BT (registered trademark)) communication also has a plurality of standards including BTLE (Bluetooth (registered trademark) Low Energy) standard in which power consumption is less than the existing Bluetooth (BT (registered trademark)) communication. Note that "BTLE" is described as "BLE" in some cases.

Note that the "Bluetooth (BT (registered trademark)) communication" described in this specification includes not only the existing Bluetooth (BT (registered trademark)) communication but also Bluetooth (BT (registered trademark)) communication according to the BTLE (Bluetooth (registered trademark) Low Energy) standard.

Figure 7:
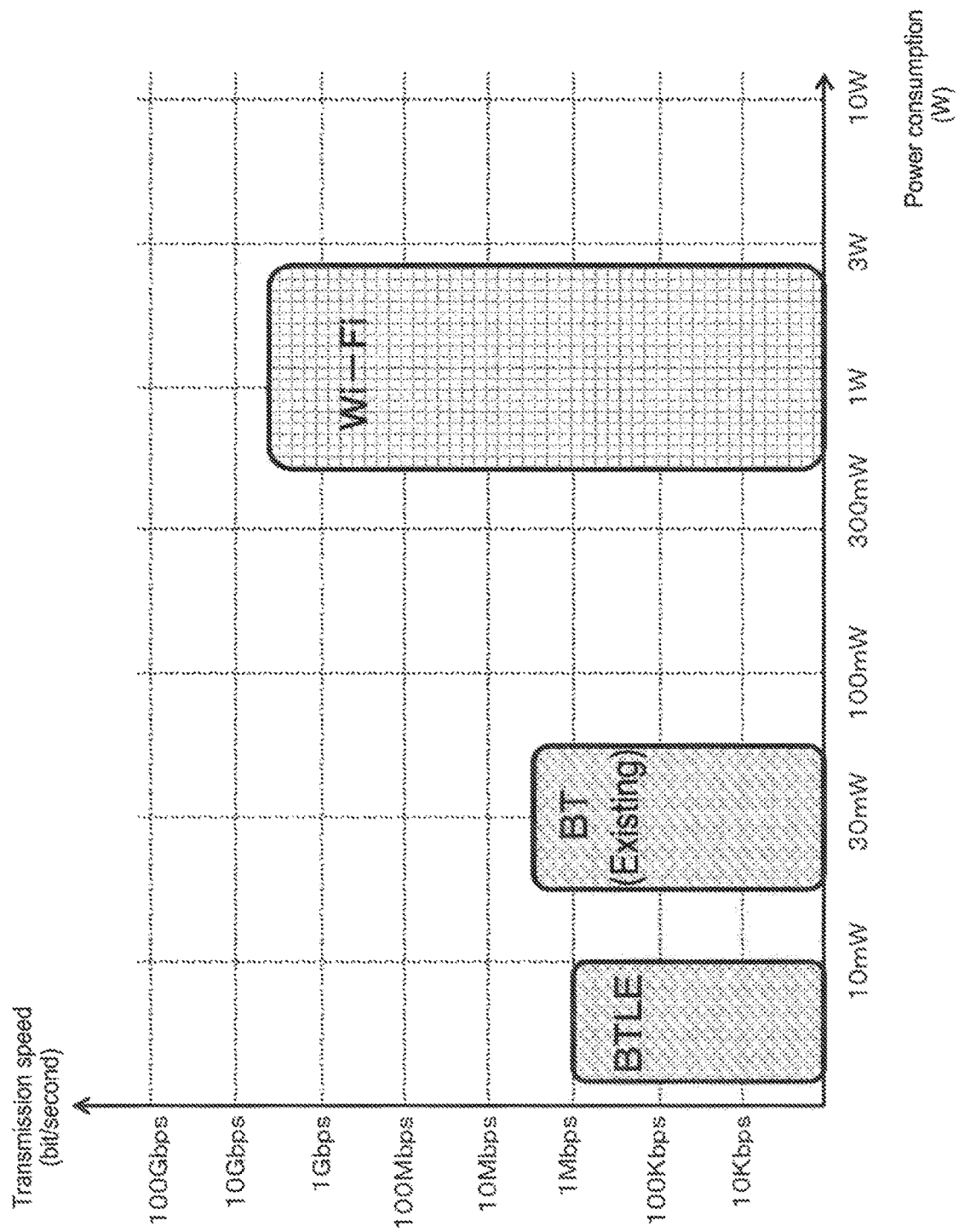
FIG. 7 is a diagram for describing characteristics of Wi-Fi communication and Bluetooth (BT) communication.

FIG. 7 is a diagram showing power consumption and a transmission speed of the Wi-Fi communication, the BT (existing) communication, and the BTLE communication.

As shown in FIG. 7, the Wi-Fi communication has a high transmission speed but consumes large amounts of power.

Meanwhile, BT and BTLE have the characteristics of a low transmission speed and less power consumption.

In the system of the present disclosure, power saving is achieved by using the Wi-Fi communication and the Bluetooth (registered trademark) communication in combination between the video camera 10 and the remote controller 20 and control both of the communications.

3. Regarding Communication Processing Between Video Camera and Remote Controller and Mode Transition Next, the communication processing executed between the video camera 10 and the remote controller 20 of the present disclosure and the mode transition will be described with reference to FIG. 8 and following figures.

Figure 8:
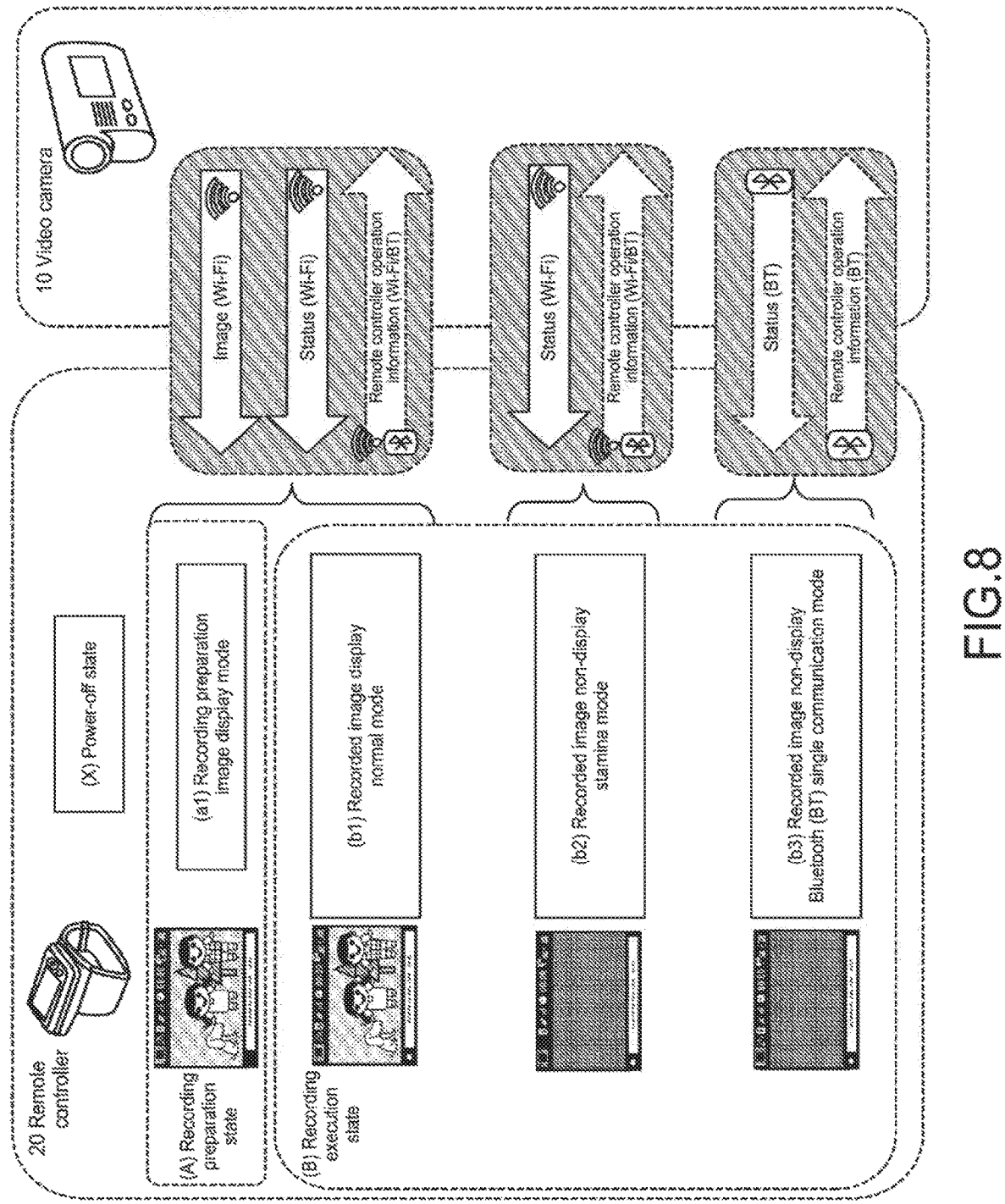
FIG. 8 is a diagram for describing a set example of communication patterns corresponding to modes between the video camera and the remote controller.

FIG. 8 is a diagram for describing a plurality of states and modes set in the remote controller 20, and patterns of communication with the video camera 10 in the respective states or modes.

As shown in FIG. 8, the remote controller 20 transitions between the three states.

(X) Power-off state
(A) Recording preparation state
(B) Recording execution state Further, the remote controller 20 is set to (a1) recording preparation image display mode in (A) recording preparation state.

Furthermore, in (B) recording execution state, the remote controller 20 is set to any of those three modes.

(b1) Recorded image display normal mode
(b2) Recorded image non-display stamina mode
(b3) Recorded image non-display Bluetooth (BT) single communication mode In a case where a user operation or a preset mode transition condition is provided, the remote controller 20 transitions between the different modes.

As shown in FIG. 8, a communication pattern executed between the remote controller 20 and the video camera 10 is prescribed to correspond to each mode. According to the occurrence of a mode transition, the communication pattern is changed in some cases.

In a case where the remote controller 20 is set to one of the following two modes, (a1) Recording preparation image display mode, or
(b1) Recorded image display normal mode, an image and status information are transmitted from the video camera 10 to the remote controller 20 through the Wi-Fi communication, and operation information of the remote controller 20 is transmitted to the video camera 10 by using the Wi-Fi communication and the BT communication in combination.

Note that the image data transmitted from the video camera 10 through the Wi-Fi communication is, in "(a1) recording preparation image display mode", a captured image that is not recorded, and in "(b1) recorded image display normal mode", a captured image that is recorded (recorded image).

The status information transmitted from the video camera 10 through the Wi-Fi communication includes, for example, information on whether recording is executed or not, information on the image quality (HD, SD, etc.) of the captured image, recording time period information, and battery remaining amount information of the battery mounted to the video camera.

Further, the operation information of the remote controller 20 is transmitted to the video camera 10 by using the Wi-Fi communication and the BT communication in combination. For each piece of the operation information, a communication path of the Wi-Fi communication or the BT communication to be used is prescribed in advance on the basis of the operation type.

For example, power-on/off information of the video camera 10 or the like is transmitted by using the BT communication path.

The operation information of recording start/stop processing or the like is transmitted to the video camera 10 by using the Wi-Fi communication path.

Other pieces of operation information are also transmitted to the video camera 10 via any of the communication paths prescribed on the basis of the operation types.

Note that in a case where the communication path of one of the Wi-Fi communication and the BT communication is disconnected, the operation information is transmitted via the other connected communication path in some cases.

Next, description will be given on a communication configuration in a case where the remote controller 20 is set to the following mode shown in the middle of FIG. 8: (b2) recorded image non-display stamina mode.

In a case where the remote controller 20 is set to this stamina mode, as shown in FIG. 8, the status information is transmitted from the video camera 10 to the remote controller 20 through the Wi-Fi communication, and the operation information of the remote controller 20 is transmitted to the video camera 10 by using the Wi-Fi communication and the BT communication in combination.

In "(b2) recorded image non-display stamina mode", images are not transmitted from the video camera 10 to the remote controller 20.

In this stamina mode, image transmission from the video camera 10 to the remote controller 20 is stopped, and image display in the remote controller 20 is also stopped.

By the stop of the image transmission and the display processing, the consumption of the batteries is reduced, and the power saving is achieved.

Note that the status information transmitted from the video camera 10 through the Wi-Fi communication includes, for example, information on whether recording is executed or not, information on the image quality (HD, SD, etc.) of the recorded image, recording time period information, and battery remaining amount information of the battery mounted to the video camera.

Further, the operation information of the remote controller 20 is transmitted to the video camera 10 by using the Wi-Fi communication and the BT communication in combination. For each piece of the operation information, a communication path of the Wi-Fi communication or the BT communication to be used is prescribed in advance on the basis of the operation type.

For example, the power-on/off information of the video camera 10 or the like is transmitted by using the BT communication path.

The operation information of recording start/stop processing or the like is transmitted to the video camera 10 by using the Wi-Fi communication path.

Other pieces of operation information are also transmitted to the video camera 10 via any of the communication paths prescribed on the basis of the operation types.

Note that in a case where the communication path of one of the Wi-Fi communication and the BT communication is disconnected, the operation information is transmitted via the other connected communication path.

Next, description will be given on a communication configuration in a case where the remote controller 20 is set to the following mode shown in the bottom of FIG. 8: (b3) recorded image non-display Bluetooth (BT) single communication mode.

In a case where the remote controller 20 is set to this mode, as shown in FIG. 8, the status information is transmitted from the video camera 10 to the remote controller 20 not through the Wi-Fi communication but through the BT communication, and the operation information of the remote controller 20 is also transmitted to the video camera 10 by using only the BT communication.

In other words, in "(b3) recorded image non-display Bluetooth (BT) single communication mode", images are not transmitted from the video camera 10 to the remote controller 20. In addition, the Wi-Fi connection between the video camera 10 and the remote controller 20 is disconnected, and all of the data transfer via the Wi-Fi communication path is stopped.

All of the communication between the video camera 10 and the remote controller 20, such as transmission of the status information from the video camera 10 to the remote controller 20 and transmission of the operation information from the remote controller 20 to the video camera 10, is executed by using only the BT communication path.

As described above with reference to FIG. 7, the BT communication has less power consumption than the Wi-Fi communication.

Therefore, in "(b3) recorded image non-display Bluetooth (BT) single communication mode", using only the BT communication achieves further power saving.

Note that in this embodiment the BT communication is any of the existing BT communication and BTLE (or BLE) communication, which have been described with reference to FIG. 7.

Note that the status information transmitted from the video camera 10 through the BT communication includes, for example, information on whether recording is executed or not, information on the image quality (HD, SD, etc.) of the recorded image, recording time period information, and battery remaining amount information of the battery mounted to the video camera.

Further, all of the operation information of the remote controller 20 is transmitted by using the BT communication.

For example, the power-on/off information of the video camera 10, the operation information of recording start/stop processing or the like, and other pieces of operation information are all transmitted to the video camera 10 by using the BT communication path.

4. Regarding State Transition and Mode Transition in Remote Controller

Next, state transition and mode transition in the remote controller 20 will be described with reference to FIG. 9.

As described above with reference to FIG. 8, the states set for the remote controller 20 are the following three states.
(X) Power-off state
(A) Recording preparation state
(B) Recording execution state Further, the remote controller 20 is set to (a1) recording preparation image display mode in (A) recording preparation state.

Furthermore, in (B) recording execution state, the remote controller 20 is set to any of those three modes.
(b1) Recorded image display normal mode
(b2) Recorded image non-display stamina mode
(b3) Recorded image non-display Bluetooth (BT) single communication mode The remote controller 20 transitions between the plurality of states or modes in response to the occurrence of a user operation or a predetermined mode transition condition.

Such transition processing is performed under the control of a controller unit of the remote controller 20.

The controller unit of the remote controller 20 performs control of changing an apparatus mode on the basis of, for example, an input of the operation information to the operation unit of the remote controller 20 or duration of an unoperated state where no operation information is input. Further, the controller unit executes change processing of the communication form using the communication unit in response to the change of the apparatus mode.

Figure 9:
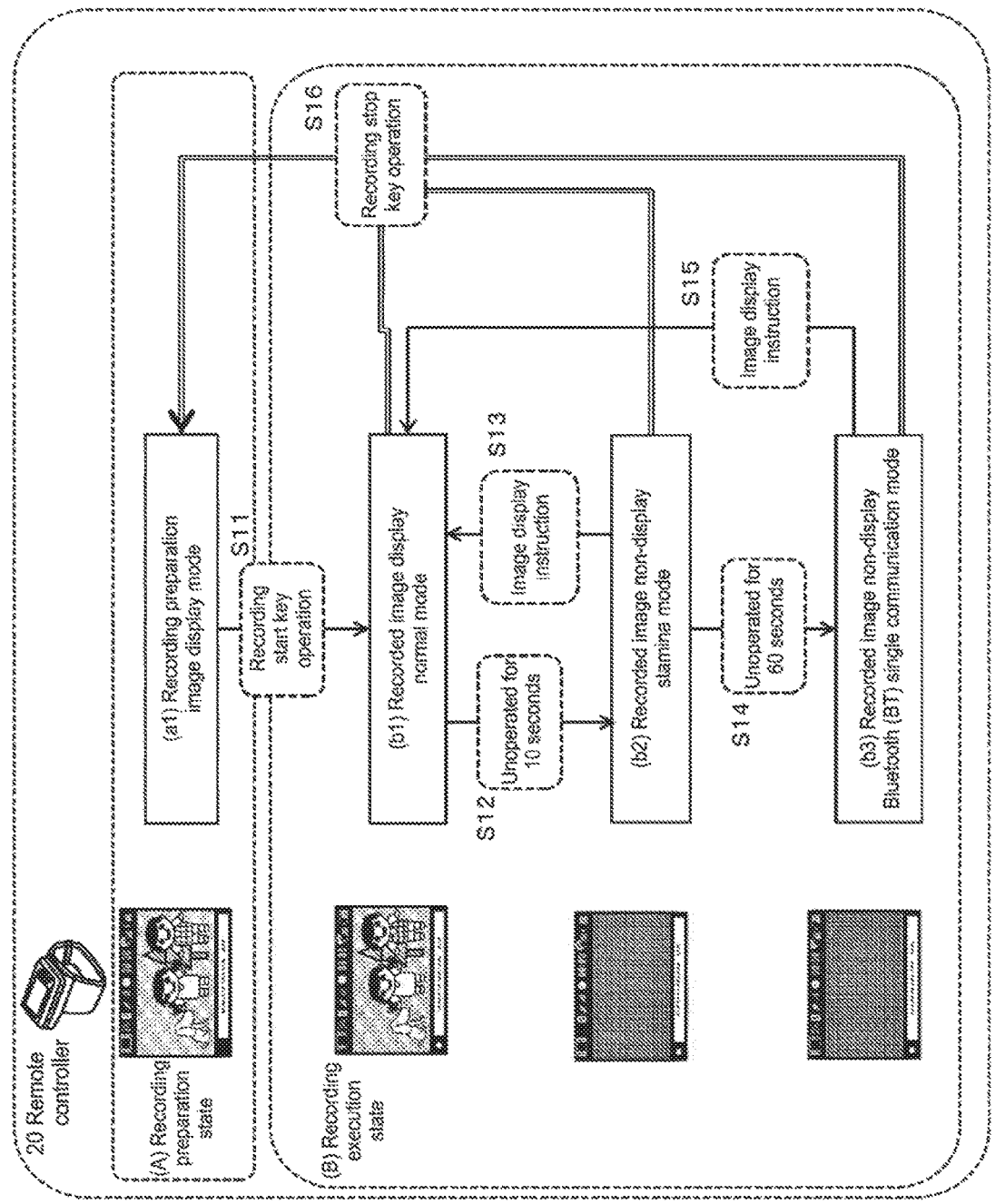
FIG. 9 is a diagram for describing state transition and mode transition of the remote controller.

FIG. 9 is a diagram for describing the state transition and the mode transition in the remote controller 20.

FIG. 9 shows the steps of occurrence of the state transition and the mode transition as Steps S11 to S16.

Hereinafter, the processing of each step will be sequentially described.

(Step S11)

Step S11 is a mode transition step from (a1) recording preparation image display mode of (A) recording preparation state to (b1) recorded image display normal mode of (B) recording execution state.

This mode transition is executed by a key operation performed by the user on a recording start/stop key (also referred to as REC key or start-stop (SS) key) of the remote controller 20.

Note that, in (a1) recording preparation image display mode of (A) recording preparation state, a captured image of the video camera 10 is transmitted to the remote controller 20 via Wi-Fi, and processing of displaying the captured image (≠recorded image) on the display unit 21 of the remote controller 20 is executed.

Note that this display image is an image on which the recording processing is not performed.

In (a1) recording preparation image display mode of (A) recording preparation state, when the user performs a recording start operation on the remote controller 20, i.e., a key operation on the recording start/stop key (REC key), the mode shifts to (b1) recorded image display normal mode of (B) recording execution state. In this state transition processing, the following processing is performed:

(1) processing to transmit a recording start request from the remote controller 20 to the video camera 10;

(2) processing to start the recording processing of the video camera 10;

(3) processing to transmit a captured image (=recorded image) of the video camera 10 to the remote controller 20; and (4) processing to display the captured image (=recorded image) on the display unit 21 of the remote controller 20.

Note that the display image transmitted at this moment is an image on which the recording processing is not performed.

(Step S12)

Step S12 is a mode transition step from (b1) recorded image display normal mode of (B) recording execution state to (b2) recorded image non-display stamina mode of (B) recording execution state.

This mode transition occurs in a case where a user operation to the remote controller 20 is not executed for a prescribed time (e.g., 10 seconds) in (b1) recorded image display normal mode.

In this state transition processing, the following processing is performed:

(1) processing to transmit a recorded image transmission stop request from the remote controller 20 to the video camera 10;

(2) processing to stop transmitting a captured image (=recorded image) of the video camera 10 to the remote controller 20; and (3) processing to stop displaying the captured image (=recorded image) on the display unit 21 of the remote controller 20.

Note that even if this mode transition occurs, the video camera 10 continues the recording processing.

By this processing, the transmission of the captured image from the video camera 10 to the remote controller 20 is stopped, and the display of the captured image on the display unit 21 of the remote controller 20 is also stopped.

By this processing, the consumption of the batteries of the video camera 10 and the remote controller 20 is reduced, and the power saving is achieved.

(Step S13)

Step S13 is a mode transition step from (b2) recorded image non-display stamina mode of (B) recording execution state to (b1) recorded image display normal mode of (B) recording execution state.

This mode transition occurs in a case where the user inputs an image display instruction to the remote controller 20 in (b2) recorded image non-display stamina mode.

Note that, in (b2) recorded image non-display stamina mode, during the input operation of the user to the remote controller 20, most of key operations with keys other than a specific key such as the recording start/stop key (REC key (=SS key)) or touch operations to the display unit functioning as a touch panel is interpreted as an image display instruction input, and the mode transition of this Step S13 occurs.

By this mode transition processing, the following processing is executed:

(1) processing to request the transmission of a captured image (=recorded image) from the remote controller 20 to the video camera 10, (2) processing to transmit a captured image (=recorded image) of the video camera 10 to the remote controller 20, and (3) processing to display the captured image (=recorded image) on the display unit 21 of the remote controller 20.

Note that the display image transmitted at this moment is an image on which the recording processing is not performed.

(Step S14)

Step S14 is a mode transition step from (b2) recorded image non-display stamina mode of (B) recording execution state to (b3) recorded image non-display Bluetooth (BT) single communication mode of (B) recording execution state.

This mode transition occurs in a case where a user operation to the remote controller 20 is not executed for a prescribed time (e.g., 60 seconds) in (b2) recorded image non-display stamina mode.

In this state transition processing, the following processing is performed:

(1) processing to stop the Wi-Fi connection between the remote controller 20 and the video camera 10;

(2) processing to switch, from the Wi-Fi communication path to the BT communication path, a transmission path for the status information from the video camera 10; and (3) processing to switch, to the BT communication path only without using the Wi-Fi communication path, a transmission path for the operation information from the remote controller 20 to the video camera 10.

Note that even if this mode transition occurs, the video camera 10 continues the recording processing.

By this processing, the Wi-Fi connection between the video camera 10 and the remote controller 20 is stopped.

By this processing, the consumption of the batteries of the video camera 10 and the remote controller 20 is further reduced, and further power saving is achieved.

(Step S15)

Step S15 is a mode transition step from (b3) recorded image non-display Bluetooth (BT) single communication mode of (B) recording execution state to (b1) recorded image display normal mode of (B) recording execution state.

This mode transition occurs in a case where the user inputs an image display instruction to the remote controller 20 in (b3) recorded image non-display Bluetooth (BT) single communication mode described above.

Note that in (b3) recorded image non-display Bluetooth (BT) single communication mode, during the input operation of the user to the remote controller 20, most of key operations with keys other than a specific key such as the recording start/stop key (REC key (=SS key)) or touch operations to the display unit functioning as a touch panel is interpreted as an image display instruction input, and the mode transition of this Step S15 occurs.

By this mode transition, the following processing is executed:

(1) processing to request the transmission of a captured image (=recorded image) from the remote controller 20 to the video camera 10;

(2) processing to transmit a captured image (=recorded image) of the video camera 10 to the remote controller 20; and (3) processing to display the captured image (=recorded image) on the display unit 21 of the remote controller 20.

Note that the display image transmitted at this moment is an image on which the recording processing is not performed.

(Step S16)

Step S16 is a mode transition step from any one of (b1) recorded image display normal mode of (B) recording execution state, (b2) recorded image non-display stamina mode of (B) recording execution state, and (b3) recorded image non-display Bluetooth (BT) single communication mode of (B) recording execution state to (a1) recording preparation image display mode of (A) recording preparation state.

This mode transition occurs in a case where the user executes an input operation for recording stop, i.e., a key operation to the recording start/stop key (REC key (=SS key)) of the remote controller 20 in any mode of the (b1) to (b3) described above.

For example, this is the operation performed on a recording stop button.

By this mode transition, the following processing is executed:

(1) processing to transmit a recording processing stop request from the remote controller 20 to the video camera 10;

(2) processing to stop the recording processing of the video camera 10;

(3) processing to transmit a captured image (≠recorded image) of the video camera 10 to the remote controller 20; and (4) processing to display the captured image (≠recorded image) on the display unit 21 of the remote controller 20.

Note that the display image transmitted after this mode transition is an image on which the recording processing is not performed.

5. Regarding Configuration to Display Operable Information in Each Mode on Remote Controller As described with reference to FIGS. 8 and 9, the remote controller causes a plurality of states or modes to transition therebetween in response to a user operation or the like. According to a set mode for the remote controller, a processing type that the user can operate on the remote controller differs.

As described above with reference to FIGS. 8 and 9, the set mode for the remote controller includes the following modes:

(a1) recording preparation image display mode of (A) recording preparation state;

(b1) recorded image display normal mode of (B) recording execution state;

(b2) recorded image non-display stamina mode of (B) recording execution state; and (b3) recorded image non-display Bluetooth (BT) single communication mode of (B) recording execution state.

For example, the recording start/stop key (REC key (=SS key)) is valid in any of the modes described above. In other words, processing corresponding to the user operation is executed.

However, for example, in (b3) recorded image non-display Bluetooth (BT) single communication mode of (B) recording execution state, the Wi-Fi communication with the video camera 10 is interrupted. In this mode, even if the user performs a key operation by which the operation information is set to be transmitted to the video camera 10 via the Wi-Fi communication, the operation information is not transmitted to the video camera 10, and even if the user repeats the key operation, the processing desired by the user is not executed in some cases.

Note that as described above with reference to FIGS. 8 and 9, for example, in a case where the set mode of the remote controller is any of the following modes:

(b2) recorded image non-display stamina mode of (B) recording execution state; and (b3) recorded image non-display Bluetooth (BT) single communication mode of (B) recording execution state, when the recording start/stop key (REC key (=SS key)) is operated, processing corresponding to the key, i.e., recording stop processing is executed.

However, most of key operations with keys other than a specific key such as the recording start/stop key (REC key (=SS key)) is interpreted as an image display start request. As a result, mode shift processing to (b1) recorded image display normal mode of (B) recording execution state is performed.

Even if the user intends to execute the original processing assigned to each key of the remote controller, that processing is not executed, and the mode shift processing described above is performed.

When such processing is performed, there is a possibility that the user is given a sense of uncertainty, e.g., the user is wondering if a failure has occurred.

In the following, a configuration that solves such a problem will be described.

Specifically, it is a configuration in which operable information in each mode is displayed on the display unit of the remote controller, and thus the user can be notified of a validly available key.

A specific example will be described with reference to FIG. 10.

Figure 10:
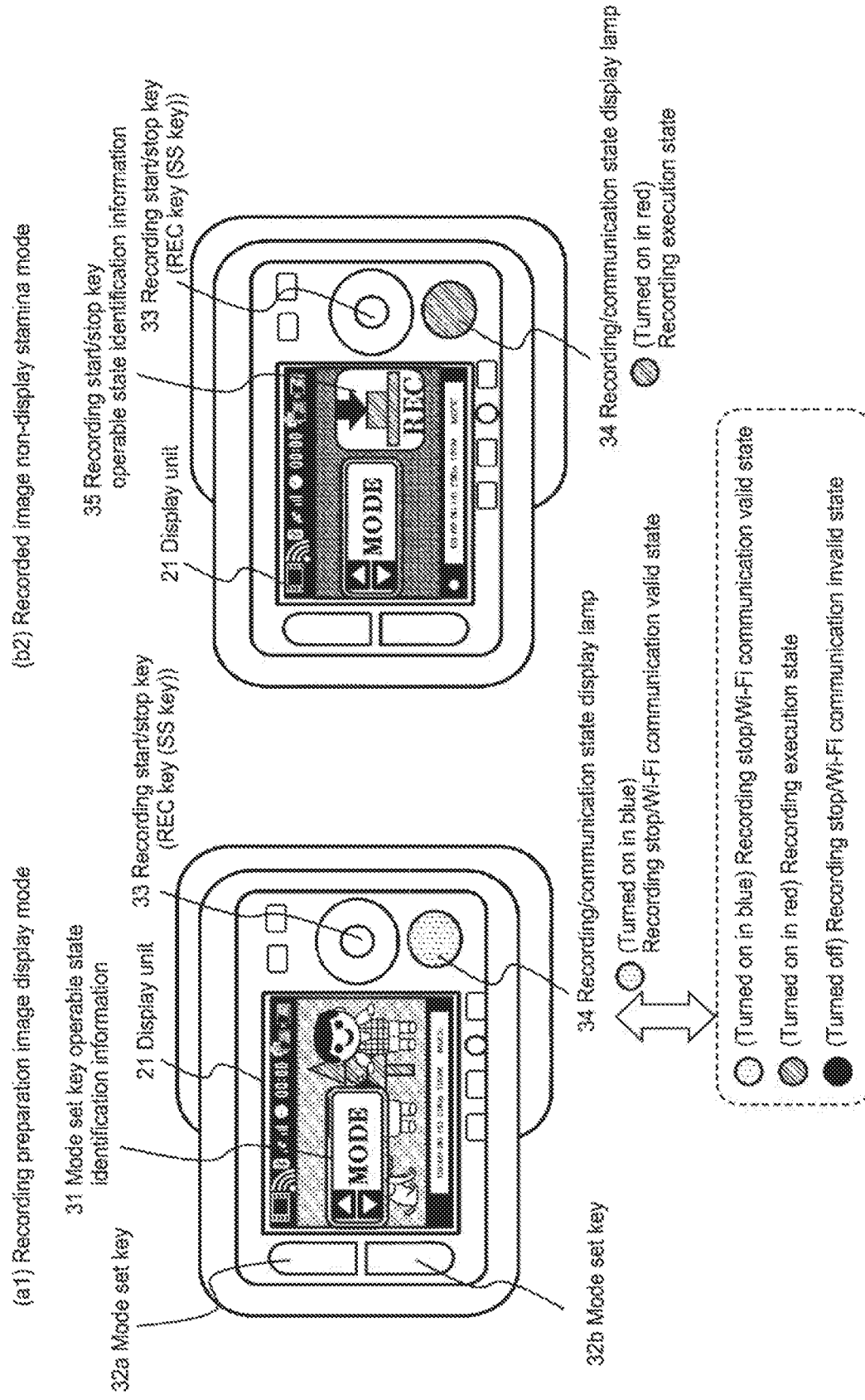
FIG. 10 is a diagram for describing an example of the display data of the display unit of the remote controller.

FIG. 10 shows a display example of the display unit 21 of the remote controller 20 in the following two modes:

(a1) recording preparation image display mode of (A) recording preparation state; and (b2) recorded image non-display stamina mode of (B) recording execution state.

As shown in FIG. 10, a "mode set key operable state identification information 31" is displayed on the display unit 21 of the remote controller in (a1) recording preparation image display mode.

As shown in FIG. 10, mode set keys 32a and 32b are user-operable keys provided to a side of the display unit 21.

For example, the image capturing mode such as a moving image capturing mode or a still image capturing mode can be switched by operating the mode set keys 32a and 32b.

The mode set key operable state identification information 31 displayed on the display unit 21 is display information for notifying the user that the operation of the mode set keys 32a and 32b is valid. In other words, this display information functions as valid operation unit identification information.

The user views the "mode set key operable state identification information 31" displayed on the display unit 21 and can thus know that the mode set keys 32a and 32b are valid and the operation of those keys enables switching of the image capturing mode such as the moving image capturing mode or the still image capturing mode.

Further, a display example of the display unit 21 of the remote controller in (b2) recorded image non-display stamina mode is shown on the right side of FIG. 10. In addition to the "mode set key operable state identification information 31", a "recording start/stop key operable state identification information 35" is displayed on the display unit 21.

The "mode set key operable state identification information 31" is information indicating that the mode set keys 32a and 32b are valid, as described above.

The "recording start/stop key operable state identification information 35" is also displayed so as to notify the user that a recording start/stop key (REC key (SS key)) 33 provided to a side of the display unit 21 is valid.

The recording start/stop key (REC key (SS key)) 33 is a key for executing the start of recording processing and the stop of recording processing.

The user views the "recording start/stop key operable state identification information 35" displayed on the display unit 21 and can thus know that the recording start/stop key (REC key (SS key)) 33 is valid and the operation of the key enables the start or stop of the recording processing.

In such a manner, identification information regarding a validly available key in each mode is displayed on the display unit 21 of the remote controller 20.

The user views those pieces of identification information and can thus confirm which key of the remote controller 20 is available and then perform a key operation after this confirmation.

Note that as shown in FIG. 10, the remote controller 20 includes a recording/communication state display lamp 34 next to the recording start/stop key (REC key (SS key)) 33.

The recording/communication state display lamp 34 is a lamp indicating an execution state of the recording processing of the video camera 10 or a Wi-Fi communication available state between the remote controller 20 and the video camera.

Figure 11:
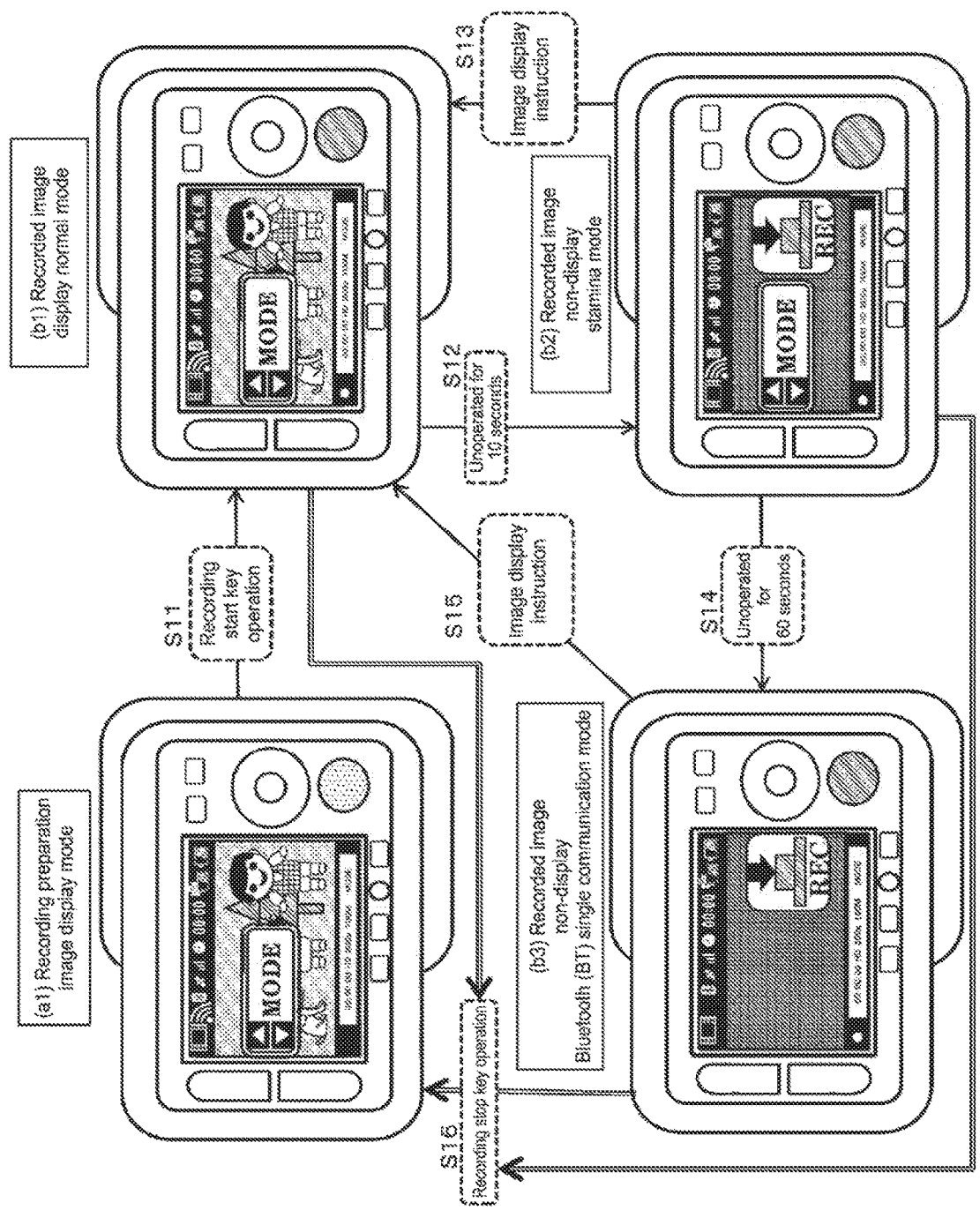
FIG. 11 is a diagram for describing an example of the mode transition of the remote controller and the display data of the display unit.

The display is switched as follows.
(a) Turned on in blue: indicating a recording stop state and a Wi-Fi communication valid state
(b) Turned on in red: indicating a recording execution state
(c) Turned off: indicating a recording stop state and a Wi-Fi communication invalid state FIG. 11 shows a display example of identification information regarding a validly available key displayed on the display unit 21 in each of the following four modes of the remote controller 20:

(a1) recording preparation image display mode of (A) recording preparation state;
(b1) recorded image display normal mode of (B) recording execution state;
(b2) recorded image non-display stamina mode of (B) recording execution state; and
(b3) recorded image non-display Bluetooth (BT) single communication mode of (B) recording execution state.

In (a1) recording preparation image display mode of (A) recording preparation state, the following identification information is displayed:
"mode set key operable state identification information".

The user views the "mode set key operable state identification information" displayed on the display unit 21 of the remote controller 20 and can thus know that the mode can be changed by the operation of the mode set keys of the remote controller 20.

The recording/communication state display lamp 34 is set to be turned on in blue, which indicates a recording stop state and a Wi-Fi communication valid state. Also in (b1) recorded image display normal mode of (B) recording execution state, the following identification information is displayed:
"mode set key operable state identification information".

The user views the "mode set key operable state identification information" displayed on the display unit 21 of the remote controller 20 and can thus know that the mode can be changed by the operation of the mode set keys of the remote controller 20.

The recording/communication state display lamp 34 is set to be turned on in red, which indicates a recording execution state.

In (b2) recorded image non-display stamina mode of (B) recording execution state, the following identification information is displayed:
"mode set key operable state identification information"; and
"recording start/stop key operable state identification information".

The user views the "mode set key operable state identification information" displayed on the display unit 21 of the remote controller 20 and can thus know that the mode can be changed by the operation of the mode set keys of the remote controller 20.

Further, the user views the "recording start/stop key operable state identification information" displayed on the display unit 21 of the remote controller 20 and can thus know that the start or stop of the recording processing can be performed by the operation of the recording start/stop key of the remote controller 20.

The recording/communication state display lamp 34 is set to be turned on in red, which indicates a recording execution state.

In (b3) recorded image non-display Bluetooth (BT) single communication mode of (B) recording execution state, the following identification information is displayed: "recording start/stop key operable state identification information".

The user views the "recording start/stop key operable state identification information" displayed on the display unit 21 of the remote controller 20 and can thus know that the start or stop of the recording processing can be performed by the operation of the recording start/stop key of the remote controller 20.

Note that the operation information of the recording start/stop key of the remote controller 20 is transmitted to the video camera 10 through the Bluetooth (BT) communication.

The controller unit of the remote controller 20 displays, on the display unit 21, valid operation unit identification information corresponding to a valid operation unit that is changed on the basis of an available communication path with the video camera 10.

The recording/communication state display lamp 34 is set to be turned on in red, which indicates a recording execution state.

During a period in which the recording processing of the video camera 10 is in execution, the controller unit of the remote controller 20 performs control of indicating that the recording processing is in execution, i.e., setting the recording/communication state display lamp 34 to be turned on in read, which indicates a recording execution state, irrespective of the presence or absence of the processing of displaying a captured image.

The user can confirm, by the display of the lamp, that the recording processing is being performed irrespective of the presence or absence of the display of an image.

As described above, the remote controller 20 executes communication with the video camera 10 by using the Wi-Fi communication and the Bluetooth (BT (registered trademark)) communication. Further, the remote controller 20 interrupts the Wi-Fi communication with the video camera 10 on the basis of a continuous state of a period in which there is no operation on the operation unit of the remote controller 20.

The controller unit of the remote controller 20 displays, on the display unit 21, the valid operation unit identification information corresponding to a valid operation unit that is changed on the basis of an available communication path with the video camera 10.

For example, during the period in which the Wi-Fi communication with the video camera 10 is stopped, the controller unit displays, on the display unit 21, valid operation unit identification information corresponding to an operation unit that can transmit the operation information to the video camera 10 via the Bluetooth (BT (registered trademark)).

Note that the recording start/stop key of the remote controller 20 can be used when the remote controller 20 is in any of the following modes:

(a1) recording preparation image display mode of (A) recording preparation state;
(b1) recorded image display normal mode of (B) recording execution state;
(b2) recorded image non-display stamina mode of (B) recording execution state; and
(b3) recorded image non-display Bluetooth (BT) single communication mode of (B) recording execution state.

The recording start/stop key of the remote controller 20 can be used when the remote controller 20 is in any of the modes described above.

However, in the example shown in FIG. 11, in each of (a1) recording preparation image display mode of (A) recording preparation state and (b1) recorded image display normal mode of (B) recording execution state, the "recording start/stop key operable state identification information" is not displayed.

This is because, when a captured image is displayed on the display unit 21 of the remote controller 20, information to be superimposed and displayed on the image is reduced, and the image is made easier to see.

In other words, in a non-display period in which a captured image is not displayed on the display unit 21, the controller unit of the remote controller 20 performs processing such as displaying more pieces of valid operation unit identification information than in a display period in which a captured image is displayed.

Note that also in the mode in which a captured image is displayed, a configuration to display the "recording start/stop key operable state identification information" may be adopted.

Alternatively, in a case where an image is displayed, a configuration to perform processing such as using a small icon whose display area for the "recording start/stop key operable state identification information" is reduced may be adopted.

Note that in the following mode shown in FIG. 11, i.e., (b3) recorded image non-display Bluetooth (BT) single communication mode of (B) recording execution state, the Wi-Fi communication between the remote controller 20 and the video camera 10 is interrupted.

In this mode, when the processing of Step S15 shown in FIG. 11, i.e., image display instruction processing, or the processing of Step S16, i.e., a key operation of the recording stop key or the like is performed, mode shift processing to (b1) recorded image display normal mode of (B) recording execution state or (a1) recording preparation image display mode of (A) recording preparation state respectively occurs respectively.

In the mode shift processing described above, the Wi-Fi communication processing between the remote controller 20 and the video camera 10 is performed.

This Wi-Fi connection processing needs approximately 5 to 6 seconds. The user needs to wait approximately 5 to 6 seconds, but if the display unit 21 of the remote controller 20 does not display anything, the user may wonder if a failure has occurred or an operation mistake has been made.

In order to prevent such a situation from occurring, at the time of the mode change involving the Wi-Fi connection processing, information indicating that the Wi-Fi connection processing is in execution is displayed on the display unit 21 of the remote controller 20.

FIG. 12 shows a specific example.
For example, information indicating that the Wi-Fi connection is being performed as shown in FIG. 12 is displayed. After the Wi-Fi connection is successfully established, the image display is switched to an image transmitted from the video camera 10.

Performing such processing provides a configuration to notify, at the time of the mode change involving the Wi-Fi connection processing, the user that the Wi-Fi connection processing is being executed.

6. Regarding Display Information on Display Unit of Video Camera

Next, information displayed on the display unit 11 of the video camera 10 will be described.

The video camera 10 is also set to a plurality of states or modes so as to correspond to the respective states or modes set for the remote controller 20.

The setting and transition processing of those states or modes are performed under the control of the controller unit of the video camera 10.

The controller unit of the video camera 10 performs control of changing the mode on the basis of, for example, an input of the operation information to the operation unit of the remote controller 20 or duration of an unoperated state where no operation information is input. Further, the controller unit performs change processing of the communication form using the communication unit, change processing of the display information for the display unit 11 of the video camera 10, and the like in response to the mode change.

An example of the display information displayed on the display unit 11 of the video camera 10 will be described with reference to FIG. 13.

Figure 13:
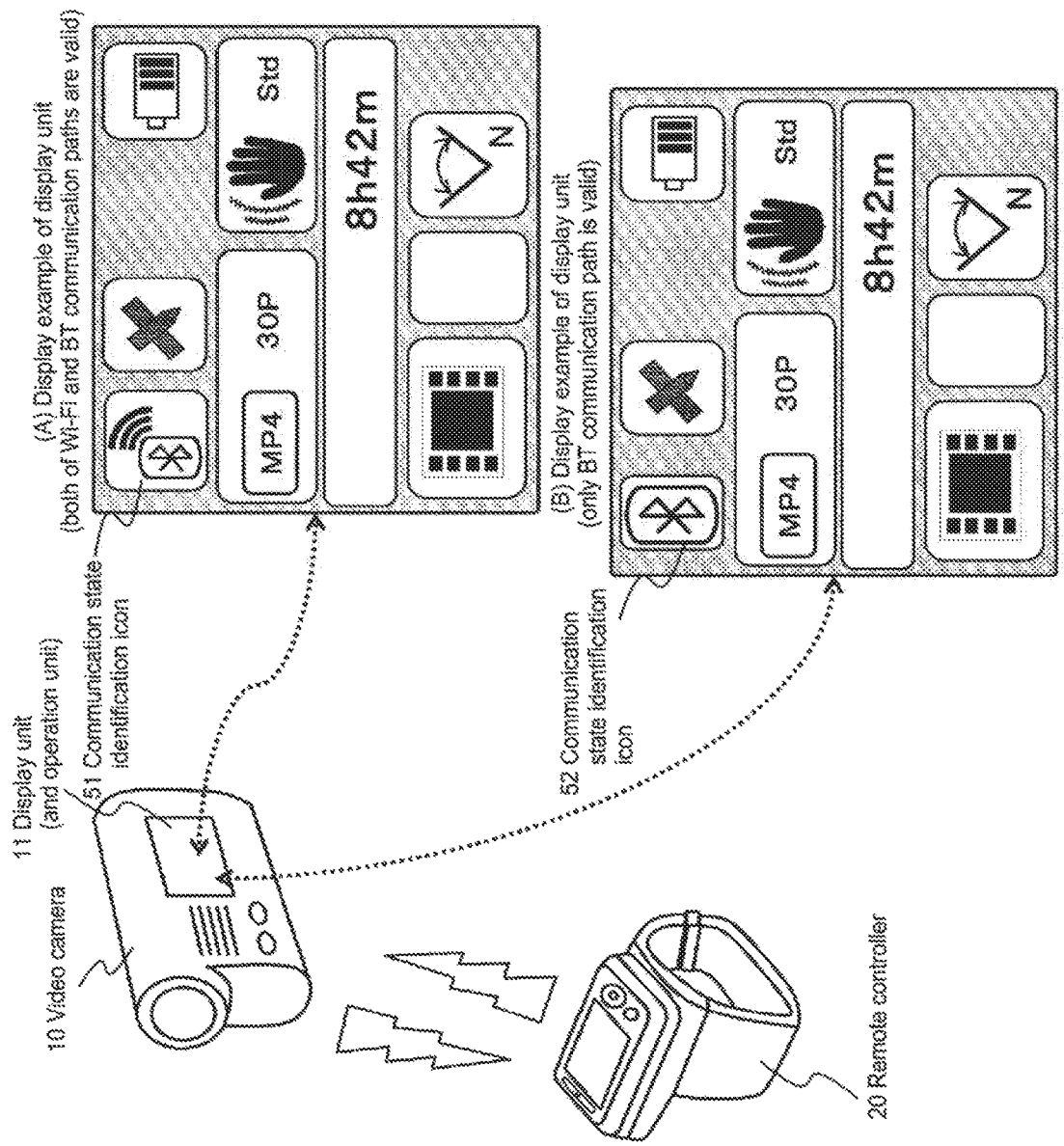
FIG. 13 is a diagram for describing an example of display data of a display unit of the video camera.

FIG. 13 shows the following two examples of the display information:
(A) display information example in which both of Wi-Fi and Bluetooth (BT) communication paths are set to be available; and
(B) display information example in which only Bluetooth (BT) communication path is set to be available.

In "(A) display information example in which both of Wi-Fi and Bluetooth (BT) communication paths are set to be available", a communication state identification icon 51 indicating a valid communication path between the video camera 10 and the remote controller 20 is an icon indicating that both the Wi-Fi and Bluetooth (BT) communication paths are available.

Meanwhile, in "(B) display information example in which only Bluetooth (BT) communication path is set to be available", a communication state identification icon 52 indicating a valid communication path between the video camera 10 and the remote controller 20 is an icon indicating that only the Bluetooth (BT) communication path is available.

The communication state identification icon 51 shown in (A) of FIG. 13 is one icon generated by combining a Wi-Fi icon and a Bluetooth (BT) icon.

Use of such an icon enables a display space to be reduced and the limited display space to be effectually used, compared with a case where the Wi-Fi icon and the Bluetooth (BT) icon are independently displayed.

FIG. 14 is a diagram for describing main icons displayed on the display unit 11 of the video camera 10.

FIG. 14 shows description regarding the following icons.
(1) Wi-Fi and Bluetooth (BT (registered trademark)) connection information
(2) Bluetooth (BT (registered trademark)) connection information
(3) GPS information
(4) Camera battery remaining amount information Those icons are part of icons displayed on the display unit 11 of the video camera 10 shown in FIG. 13.

The icon shown in (1) is Wi-Fi and Bluetooth (BT (registered trademark)) connection information. As described above, this icon is an icon displayed in a case where both of the Wi-Fi communication and the Bluetooth (BT) communication between the video camera 10 and the remote controller 20 are available.

In a case where both of the Wi-Fi communication and the Bluetooth (BT) communication between the video camera 10 and the remote controller 20 are unavailable, the icon is not displayed.

The icon shown in (2) is Bluetooth (BT (registered trademark)) connection information. This icon is an icon displayed in a case where only the Bluetooth (BT) communication between the video camera 10 and the remote controller 20 is available.

In a Bluetooth (BT) non-connection state where the Bluetooth (BT) communication is unavailable between the video camera 10 and the remote controller, the icon is not displayed.

The icon shown in (3) is an icon displayed in a case where GPS information is available.

In a case where the GPS information is unavailable, the icon is not displayed.

The icon shown in (4) is camera battery remaining amount information and indicates a battery remaining amount of the battery mounted to the video camera 10. The icon is set to change the display pattern of a battery-shaped icon on the basis of the battery remaining amount.

In addition to those above, many icons indicating various types of information are displayed on the display unit 11 of the video camera 10 as shown in FIG. 13.

For example, various types of information such as a captured image type (MP4, 30P), a shake compensation pattern (Std), current time information, elapsed time information from the image capturing start, a captured image type (moving image/still image), and angle-of-view information (normal (N)/wide (W)) are displayed.

7. Regarding Mode Transition of Remote Controller and Video Camera and Display Information Corresponding to Mode Next, description will be given on the mode transition of the remote controller 20 and the video camera 10, and display information displayed in each mode on the display unit 21 of the remote controller 20 and on the display unit 11 of the video camera 10.

Figure 15:
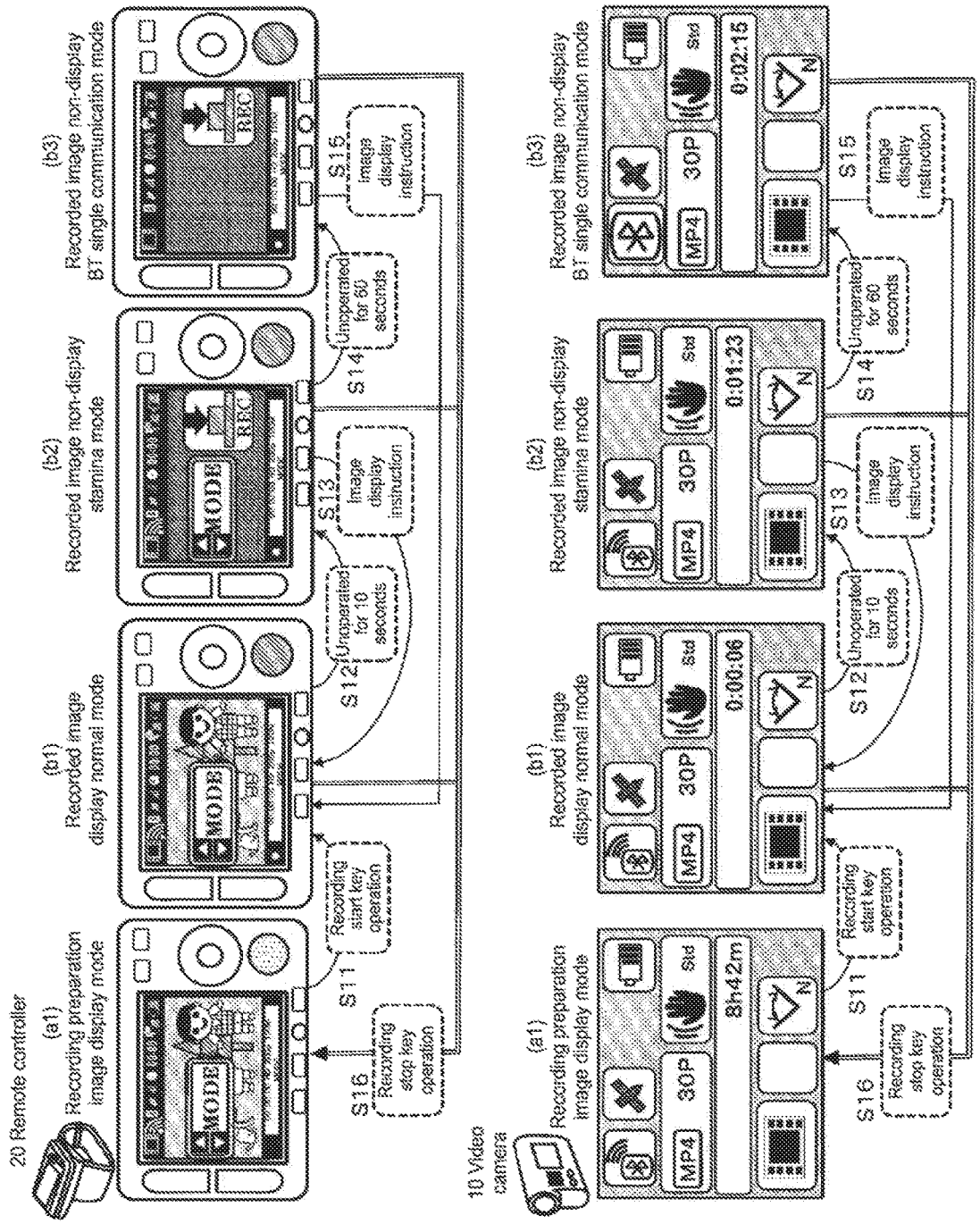
FIG. 15 is a diagram for describing the mode transition of the remote controller and the video camera and the transition of the display data of the display unit which corresponds to the mode transition.

FIG. 15 is a diagram showing the change of display information, which involves the mode transition of the remote controller 20 and the video camera 10.

The upper portion of FIG. 15 shows the mode transition of the remote controller 20 and examples of display information of the display unit 21 in the respective modes.

Meanwhile, the lower portion of FIG. 15 shows the mode transition of the video camera 10 and examples of display information of the display unit 11 in the respective modes.

Steps S11 to S16 shown in the upper portion of FIG. 15 as conditions for the mode transition of the remote controller 20 are the same as the transition steps described above with reference to FIGS. 9 and 11.

Also in the video camera 10 shown in the lower portion of FIG. 15, the mode transition similar to that of the remote controller 20 occurs according to the mode transition of the remote controller, and the video camera 10 is set to a mode similar to that of the remote controller 20.

FIG. 15 shows the following four modes as described above with reference to FIGS. 8 to 11. The four modes are as follows:
(a1) recording preparation image display mode of (A) recording preparation state;
(b1) recorded image display normal mode of (B) recording execution state;
(b2) recorded image non-display stamina mode of (B) recording execution state; and
(b3) recorded image non-display Bluetooth (BT) single communication mode of (B) recording execution state.

Hereinafter, description will be given on (1) communication state, (2) display information (remote controller, video camera), and (3) mode transition in each mode.

[7-1. Regarding Communication State, Display Information, and Mode Transition in (a1) Recording Preparation Image Display Mode of (A) Recording Preparation State]

First, description will be given on a communication state, display information, and mode transition in (a1) recording preparation image display mode of (A) recording preparation state.

(1) Communication State
In (a1) recording preparation image display mode of (A) recording preparation state, the video camera 10 and the remote controller 20 can use both of the Wi-Fi communication and the Bluetooth (BT) communication.

(2) Display Information (2a) Display information of the display unit 21 of the remote controller 20

A captured image (≠recorded image) transmitted from the video camera 10 via Wi-Fi is displayed on the display unit 21 of the remote controller 20.

Further, the recording execution lamp in the lower portion of the display unit 21 is turned off, which indicates that the recording is not executed.

The Wi-Fi connection icon and the Bluetooth (BT) connection icon are displayed in the upper portion of the display unit 21. This indicates that both of the Wi-Fi communication and the BT communication between the video camera 10 and the remote controller 20 are valid and available.

Furthermore, the following identification information is displayed on the captured image (≠recorded image):
"mode set key operable state identification information".

The user views the "mode set key operable state identification information" displayed on the display unit 21 of the remote controller 20 and can thus know that the mode can be changed by the operation of the mode set keys of the remote controller 20.

(2b) Display information of the display unit 11 of the video camera 10

A Wi-Fi/BT connection icon indicating that the Wi-Fi connection and the Bluetooth (BT) connection are valid, which is described above with reference to (1) of FIG. 14, is displayed on the display unit 11 of the video camera 10. This indicates that both of the Wi-Fi communication and the BT communication between the video camera 10 and the remote controller 20 are available.

(3) Mode Transition

In (a1) recording preparation image display mode of (A) recording preparation state, the mode transition of (Step S11) occurs by a key operation performed by the user on the recording start/stop key (REC key (SS key)) of the remote controller 20.

Step S11 is a mode transition step from (a1) recording preparation image display mode of (A) recording preparation state to (b1) recorded image display normal mode of (B) recording execution state.

In this mode transition processing, the following processing is performed:

(p) processing to transmit a recording start request from the remote controller 20 to the video camera 10;

(q) processing to start recording processing of the video camera 10;

(r) processing to transmit a captured image (=recorded image) of the video camera 10 to the remote controller 20; and (s) processing to display the captured image (=recorded image) on the display unit 21 of the remote controller 20.

Note that the display image transmitted at this moment is an image on which the recording processing is not performed.

[7-2. Regarding Communication State, Display Information, and Mode Transition in (b1) Recorded Image Display Normal Mode of (B) Recording Execution State]

Next, description will be given on a communication state, display information, and mode transition in (b1) recorded image display normal mode of (B) recording execution state.

(1) Communication State

In (b1) recorded image display normal mode of (B) recording execution state, the video camera 10 and the remote controller 20 can use both of the Wi-Fi communication and the Bluetooth (BT) communication.

(2) Display Information (2a) Display information of the display unit 21 of the remote controller 20

A captured image (=recorded image) transmitted from the video camera 10 via Wi-Fi is displayed on the display unit 21 of the remote controller 20.

Further, the recording execution lamp in the lower portion of the display unit 21 is turned on, which indicates that the recording is executed.

The Wi-Fi connection icon and the Bluetooth (BT) connection icon are displayed in the upper portion of the display unit 21. This indicates that both of the Wi-Fi communication and the BT communication between the video camera 10 and the remote controller 20 are valid and available.

Furthermore, the following identification information is displayed on the captured image (=recorded image):
"mode set key operable state identification information".

The user views the "mode set key operable state identification information" displayed on the display unit 21 of the remote controller 20 and can thus know that the mode can be changed by the operation of the mode set keys of the remote controller 20.

(2b) Display information of the display unit 11 of the video camera 10

A Wi-Fi/BT connection icon indicating that the Wi-Fi connection and the Bluetooth (BT) connection are valid, which is described above with reference to (1) of FIG. 14, is displayed on the display unit 11 of the video camera 10. This indicates that both of the Wi-Fi communication and the BT communication between the video camera 10 and the remote controller 20 are available.

(3) Mode Transition

In (b1) recorded image display normal mode of (B) recording execution state, the mode transition of (Step S12) occurs after 10 seconds have elapsed in a state where the remote controller 20 is not operated by the user.

Step S12 is a mode transition step from (b1) recorded image display normal mode of (B) recording execution state to (b2) recorded-image display stamina mode of (B) recording execution state.

In this mode transition processing, the following processing is performed:

(p) processing to transmit a recorded image transmission stop request from the remote controller 20 to the video camera 10;

(q) processing to stop transmitting a captured image (=recorded image) of the video camera 10 to the remote controller 20; and (r) processing to stop displaying the captured image (=recorded image) on the display unit 21 of the remote controller 20.

Note that even if this mode transition occurs, the video camera 10 continues the recording processing.

Further, in (b1) recorded image display normal mode of (B) recording execution state, when the user executes an input operation for recording stop, i.e., a key operation to the recording start/stop key (REC key (=SS key)) of the remote controller 20, the mode transition of (Step S16) occurs, and the mode shifts to (a1) recording preparation image display mode of (A) recording preparation state.

By this mode transition, the following processing is executed:

(p) processing to transmit a recording processing stop request from the remote controller 20 to the video camera 10;

(q) processing to stop the recording processing of the video camera 10;
(r) processing to transmit a captured image (≠recorded image) of the video camera 10 to the remote controller 20; and
(s) processing to displaying the captured image (≠recorded image) on the display unit 21 of the remote controller 20.

Note that the display image transmitted after this mode transition is an image on which the recording processing is not performed.

[7-3. Regarding Communication State, Display Information, and Mode Transition in (b2) Recorded Image Non-Display Stamina Mode of (B) Recording Execution State]

Next, description will be given on a communication state, display information, and mode transition in (b2) recorded image non-display stamina mode of (B) recording execution state.

(1) Communication State

In (b2) recorded image non-display stamina mode of (B) recording execution state, the video camera 10 and the remote controller 20 can use both of the Wi-Fi communication and the Bluetooth (BT) communication.

(2) Display Information (2a) Display information of the display unit 21 of the remote controller 20

In this mode, a captured image (=recorded image) is not transmitted from the video camera 10.

Therefore, the captured image (=recorded image) is not displayed on the display unit 21 of the remote controller 20.

It should be noted that the recording execution lamp in the lower portion of the display unit 21 is turned on, which indicates that the recording is executed.

The Wi-Fi connection icon and the Bluetooth (BT) connection icon are displayed in the upper portion of the display unit 21. This indicates that both of the Wi-Fi communication and the BT communication between the video camera 10 and the remote controller 20 are valid and available.

In this mode, the display of the captured image on the display unit 21 is stopped. It should be noted that the following identification information is displayed: "mode set key operable state identification information".

The user views the "mode set key operable state identification information" displayed on the display unit 21 of the remote controller 20 and can thus know that the mode can be changed by the operation of the mode set keys of the remote controller 20. Furthermore, on the display unit 21, "recording start/stop key operable state identification information" is displayed.

The user views the "recording start/stop key operable state identification information" displayed on the display unit 21 of the remote controller 20 and can thus know that the recording start/stop key (REC key (SS key)) of the remote controller 20 is valid and the start or stop of the recording processing can be performed by the key operation.

(2b) Display information of the display unit 11 of the video camera 10 A Wi-Fi/BT connection icon indicating that the Wi-Fi connection and the Bluetooth (BT) connection are valid, which is described above with reference to (1) of FIG. 14, is displayed on the display unit 11 of the video camera 10. This indicates that both of the Wi-Fi communication and the BT communication between the video camera 10 and the remote controller 20 are available.

(3) Mode Transition

In (b2) recorded image non-display stamina mode of (B) recording execution state, the mode transition of (Step S14) occurs after 60 seconds have elapsed in a state where the remote controller 20 is not operated by the user.

Step S14 is a mode transition step from (b2) recorded image non-display stamina mode of (B) recording execution state to (b3) recorded image non-display Bluetooth (BT) single communication mode of (B) recording execution state.

(p) Processing to stop the Wi-Fi connection between the remote controller 20 and the video camera 10
(q) Processing to switch, from the Wi-Fi communication path to the BT communication path, a transmission path for the status information from the video camera 10
(r) Processing to switch, to the BT communication path only without using the Wi-Fi communication path, a transmission path for the operation information from the remote controller 20 to the video camera 10

Note that even if this mode transition occurs, the video camera 10 continues the recording processing.

Further, in (b1) recorded image non-display stamina mode of (B) recording execution state, when the user gives an image display instruction to the remote controller 20, the mode transition of (Step S15) occurs.

Step S15 is a mode transition step from (b2) recorded image non-display stamina mode of (B) recording execution state to (b1) recorded image display normal mode of (B) recording execution state.

Note that in (b2) recorded image non-display stamina mode, during the input operation of the user to the remote controller 20, most of key operations with keys other than a specific key such as the recording start/stop key (REC key (SS key)) or touch operations to the display unit functioning as a touch panel is interpreted as an image display instruction input, and the mode transition of this Step S15 occurs.

By this mode transition, the following processing is executed:

(p) processing to request the transmission of a captured image (=recorded image) from the remote controller 20 to the video camera 10;
(q) processing to transmit a captured image (=recorded image) of the video camera 10 to the remote controller 20; and
(r) processing to display the captured image (=recorded image) on the display unit 21 of the remote controller 20.

Note that the display image transmitted at this moment is an image on which the recording processing is not performed.

Furthermore, in (b2) recorded image non-display stamina mode of (B) recording execution state, when the user executes an input operation for recording stop, i.e., a key operation to the recording start/stop key (REC key (=SS key)) of the remote controller 20, the mode transition of (Step S16) occurs, and the mode shifts to (a1) recording preparation image display mode of (A) recording preparation state.

By this mode transition, the following processing is executed:

(p) processing to transmit a recording processing stop request from the remote controller 20 to the video camera 10;
(q) processing to stop the recording processing of the video camera 10;
(r) processing to transmit a captured image (≠recorded image) of the video camera 10 to the remote controller 20; and
(s) processing to display the captured image (≠recorded image) on the display unit 21 of the remote controller 20.

Note that the display image transmitted after this mode transition is an image on which the recording processing is not performed.

[7-4. Regarding Communication State, Display Information, and Mode Transition in (b3) Recorded Image Non-Display Bluetooth (BT) Single Communication Mode of (B) Recording Execution State]

Next, description will be given on a communication state, display information, and mode transition in (b3) recorded image non-display Bluetooth (BT) single communication mode of (B) recording execution state.

(1) Communication State

In the communication state, the display information, and the mode in (b3) recorded image non-display Bluetooth (BT) single communication mode of (B) recording execution state, the video camera 10 and the remote controller 20 can use only the Bluetooth (BT) communication.

(2) Display Information (2a) Display information of the display unit 21 of the remote controller 20

In this mode, a captured image (=recorded image) is not transmitted from the video camera 10.

Therefore, the captured image (=recorded image) is not displayed on the display unit 21 of the remote controller 20.

It should be noted that the recording execution lamp in the lower portion of the display unit 21 is turned on, which indicates that the recording is executed.

In the upper portion of the display unit 21, the Wi-Fi connection icon is not displayed, and only the Bluetooth (BT) connection icon is displayed. This indicates that only the BT communication between the video camera 10 and the remote controller 20 is available.

In this mode, the display of the captured image on the display unit 21 is stopped. It should be noted that the following identification information is displayed: "mode set key operable state identification information".

The user views the "mode set key operable state identification information" displayed on the display unit 21 of the remote controller 20 and can thus know that the mode can be changed by the operation of the mode set keys of the remote controller 20. Furthermore, on the display unit 21, "recording start/stop key operable state identification information" is displayed.

The user views the "recording start/stop key operable state identification information" displayed on the display unit 21 of the remote controller 20 and can thus know that the recording start/stop key (REC key (SS key)) of the remote controller 20 is valid and the start or stop of the recording processing can be performed by the key operation.

(2b) Display information of the display unit 11 of the video camera 10

A Bluetooth (BT) connection icon indicating that the Bluetooth (BT) connection is valid, which is described above with reference to (2) of FIG. 14, is displayed on the display unit 11 of the video camera 10. This indicates that the BT communication between the video camera 10 and the remote controller 20 is available.

(3) Mode Transition

In (b3) recorded image non-display Bluetooth (BT) single communication mode of (B) recording execution state, when the user gives an image display instruction to the remote controller 20, the mode transition of (Step S15) occurs.

Step S15 is a mode transition step from (b3) recorded image non-display Bluetooth (BT) single communication mode of (B) recording execution state to (b1) recorded image display normal mode of (B) recording execution state.

Note that in (b3) recorded image non-display Bluetooth (BT) single communication mode, during the input operation of the user on the remote controller 20, most of key operations with keys other than a specific key such as the recording start/stop key (REC key (SS key)) or touch operations to the display unit functioning as a touch panel is interpreted as an image display instruction input, and the mode transition of this Step S15 occurs.

By this mode transition, the following processing is executed:

(p) processing to request the transmission of a captured image (=recorded image) from the remote controller 20 to the video camera 10;

(q) processing to transmit a captured image (=recorded image) of the video camera 10 to the remote controller 20; and (r) processing to display the captured image (=recorded image) on the display unit 21 of the remote controller 20.

Note that the display image transmitted at this moment is an image on which the recording processing is not performed.

Furthermore, in (b3) recorded image non-display Bluetooth (BT) single communication mode of (B) recording execution state, when the user executes a key operation to the recording start/stop key (REC key (SS key)) of the remote controller 20, the mode transition of (Step S16) occurs.

Step S16 is a mode transition step from (b3) recorded image non-display Bluetooth (BT) single communication mode of (B) recording execution state to (a1) recording preparation image display mode of (A) recording preparation state.

By this mode transition, the following processing is executed:

(p) processing to transmit a recording processing stop request from the remote controller 20 to the video camera 10;

(q) processing to stop the recording processing of the video camera 10;

(r) processing to transmit a captured image (≠recorded image) of the video camera 10 to the remote controller 20; and (s) processing to display the captured image (≠recorded image) on the display unit 21 of the remote controller 20.

Note that the display image transmitted after this mode transition is an image on which the recording processing is not performed.

8. Regarding Key Setting of Remote Controller and Change Example of Display Information The configuration capable of displaying the operable information of each mode on the display unit 21 of the remote controller 20 to thus notifying the user of a validly available key has been described with reference to FIG. 10.

As shown in FIG. 10, the mode set keys 32a and 32b are user-operable keys provided to a side of the display unit 21.

For example, the image capturing mode such as a moving image capturing mode or a still image capturing mode can be switched by operating the mode set keys 32a and 32b.

Those mode set keys 32a and 32b can not only function as a selector switch for the moving image and still image capturing modes, but also be used as zoom set keys for zooming-in and zooming-out, for example.

The remote controller 20 includes a function selector switch for those mode set keys 32a and 32b. By the operation of this switch, the mode set keys 32a and 32b can be changed to the zoom set keys.

In a case where the key setting of the remote controller 20 is changed in such a manner, information displayed on the display unit 21 of the remote controller 20 is also changed.

A specific example will be described with reference to FIG. 16.

Figure 16:
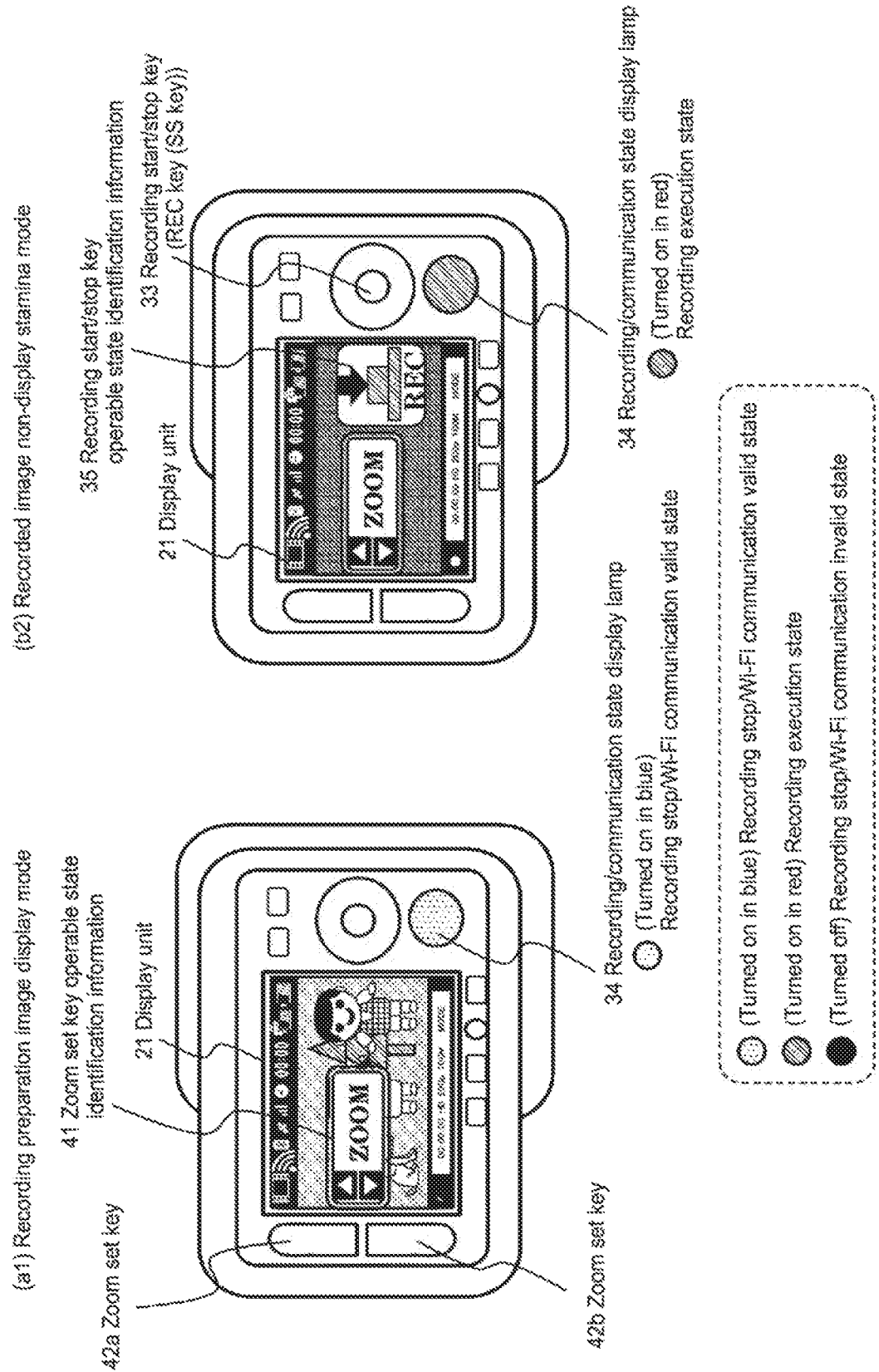
FIG. 16 is a diagram for describing an example of the display data of the display unit of the remote controller.

FIG. 16 shows a display example of the display unit 21 of the remote controller 20 in the following two modes:

(a1) recording preparation image display mode of (A) recording preparation state; and (b2) recorded image non-display stamina mode of (B) recording execution state.

As shown in FIG. 16, on the display unit 21 of the remote controller in (a1) recording preparation image display mode, a "zoom set key operable state identification information 41" is displayed.

As shown in FIG. 16, zoom set keys 42a and 42b are user-operable keys provided to a side of the display unit 21.

For example, the zoom setting of zooming-in and zooming-out can be changed by operating the zoom set keys 42a and 42b.

The zoom set key operable state identification information 41 displayed on the display unit 21 is display information for notifying the user that the operation of the zoom set keys 42a and 42b is valid.

The user views the "zoom set key operable state identification information 41" displayed on the display unit 21 and can thus know that the zoom set keys 42a and 42b are valid and zoom adjustment of zooming-in and zooming-out can be performed by the operation of those keys.

Further, a display example of the display unit 21 of the remote controller in (b2) recorded image non-display stamina mode is shown on the right side of FIG. 16. In addition to the "zoom set key operable state identification information 41", the "recording start/stop key operable state identification information 35" is displayed on the display unit 21.

The "recording start/stop key operable state identification information 35" is also displayed so as to notify the user that the recording start/stop key (REC key (SS key)) 33 provided to a side of the display unit 21 is valid.

The recording start/stop key (REC key (SS key)) 33 is a key for executing the start of recording processing and the stop of recording processing.

The user views the "recording start/stop key operable state identification information 35" displayed on the display unit 21 and can thus know that the recording start/stop key (REC key (SS key)) 33 is valid and the operation of the key enables the start or stop of the recording processing.

In such a manner, identification information regarding a validly available key in each mode is displayed on the display unit 21 of the remote controller 20.

The user views those pieces of identification information and can thus confirm which key of the remote controller 20 is available and perform a key operation after this confirmation.

9. Regarding Other Embodiments

The embodiment described above is an embodiment using the video camera 10 and the remote controller 20, but a changed configuration of the communication form according to the mode transition of the present disclosure is also applicable to various other communication apparatuses.

Description will be given with reference to FIG. 17 on a configuration example to which processing of changing the communication form according to the mode transition of the present disclosure is applicable.

Figure 17:
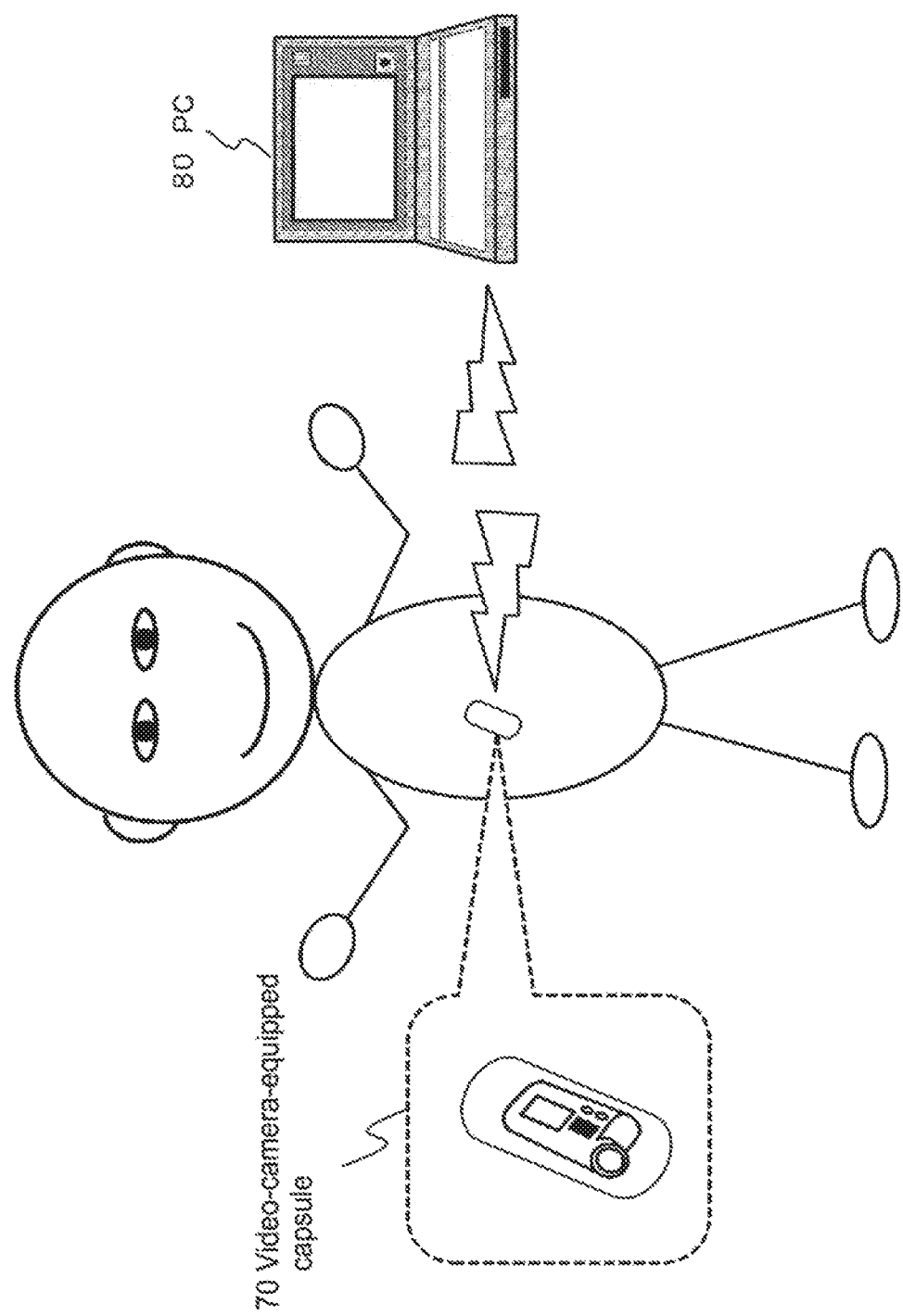
FIG. 17 is a diagram for describing another embodiment to which a configuration of the present disclosure is applied.

FIG. 17 shows a video-camera-equipped capsule 70, the capsule being swallowable by a human and storing a camera capable of capturing images therein, and a PC 80 that executes communication with the video-camera-equipped capsule 70.

The PC 80 and the video-camera-equipped capsule 70 execute various types of communication processing by using Wi-Fi communication and Bluetooth (BT) communication in combination.

Specifically, the following processing is executed:

(a) processing to transmit an image, which is captured with the video camera of the video-camera-equipped capsule 70, to the PC 80 via the Wi-Fi communication; (b) processing to transmit captured image information of the video camera of the video-camera-equipped capsule 70 or status information such as position information to the PC 80 via the Wi-Fi communication or the BT communication; and (c) processing to transmit a command from the PC 80 (command for start or stop of image capturing, zooming, image capturing with flash, or the like) to the video camera of the video-camera-equipped capsule 70 via the Wi-Fi communication or the BT communication.

Various types of data communication as described above are executed between the video camera of the video-camera-equipped capsule 70 and the PC 80.

In such data communication, the above-mentioned communication form according to the mode transition between the video camera 10 and the remote controller 20 is changed, so that power saving resulting from the reduction in consumption of the battery can be achieved.

A specific example of the mode transition will be described with reference to FIG. 18.

Figure 18:
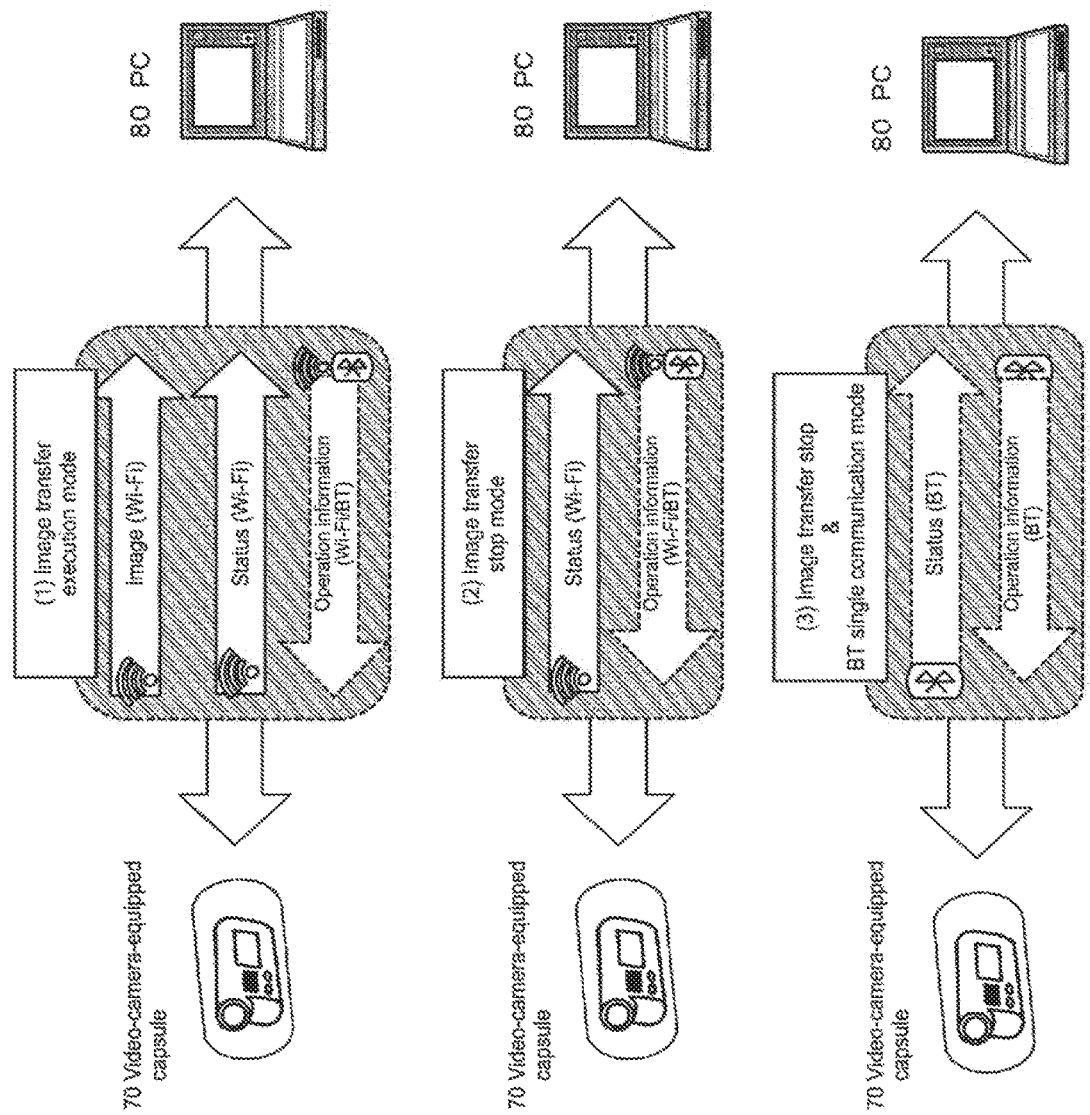
FIG. 18 is a diagram for describing a change example of communication patterns corresponding to the modes in the other embodiment to which the configuration of the present disclosure is applied.

FIG. 18 shows data communication patterns corresponding to three modes between the video camera of the video-camera-equipped capsule 70 and the PC 80.

The three modes are as follows:

(1) image transfer execution mode;

(2) image transfer stop mode; and (3) image transfer stop & Bluetooth (BT) single communication mode.

The data communication patterns between the video camera of the video-camera-equipped capsule 70 and the PC 80 in the three modes are set as follows.

(1) Image Transfer Execution Mode In this image transfer execution mode, the following data communication is executed:

(1a) transmitting an image, which is captured with the video camera of the video-camera-equipped capsule 70, to the PC 80 via the Wi-Fi communication;

(1b) transmitting captured image information of the video camera of the video-camera-equipped capsule 70 or status information such as position information to the PC 80 via the Wi-Fi communication or the BT communication; and (1c) transmitting a command from the PC 80 (command for start or stop of image capturing, zooming, image capturing with flash, or the like) to the video camera of the video-camera-equipped capsule 70 via the Wi-Fi communication or the BT communication.

In this mode, an image captured with the video camera of the video-camera-equipped capsule 70 is transmitted to the PC 80 via the Wi-Fi communication, and the transmitted image is displayed on a display unit of the PC 80.

(2) Image Transfer Stop Mode

In this image transfer stop mode, the following data communication is executed:

(2a) transmitting captured image information of the video camera of the video-camera-equipped capsule 70 or status information such as position information to the PC 80 via the Wi-Fi communication or the BT communication; and (2b) transmitting a command from the PC 80 (command for start or stop of image capturing, zooming, image capturing with flash, or the like) to the video camera of the video-camera-equipped capsule 70 via the Wi-Fi communication or the BT communication.

In this mode, the image captured with the video camera of the video-camera-equipped capsule 70 is not transmitted to the PC 80 via the Wi-Fi communication, and the display of the captured image on the PC 80 is also stopped.

By the stop of the image transmission and display processing, the consumption of the batteries of the video camera of the video-camera-equipped capsule 70 and the PC 80 is reduced, and the power saving is achieved.

(3) Image Transfer Stop & Bluetooth (BT) Single Communication Mode in this Image Transfer Stop & Bluetooth (BT) Single Communication Mode, the Following Data Communication is Executed:

(3a) transmitting captured image information of the video camera of the video-camera-equipped capsule 70 or status information such as position information to the PC 80 by using only the BT communication; and (3b) transmitting a command from the PC 80 (command for start or stop of image capturing, zooming, image capturing with flash, or the like) to the video camera of the video-camera-equipped capsule 70 by using only the BT communication.

In this mode, the image captured with the video camera of the video-camera-equipped capsule 70 is not transmitted to the PC 80 via the Wi-Fi communication, and the display of the captured image on the PC 80 is also stopped.

Further, the Wi-Fi communication for other data is also stopped.

By the stop of the image transmission and display processing and the Wi-Fi communication stop processing, the consumption of the batteries of the video camera of the video-camera-equipped capsule 70 and the PC 80 is further reduced, and further power saving is achieved.

Other than the configuration described with reference to FIGS. 17 and 18, the communication pattern corresponding to the mode of the present disclosure is changed in various communication systems using the Wi-Fi communication and the Bluetooth (BT) communication in combination, so that the consumption of the battery of each apparatus can be reduced, and the power saving can be achieved.

10. Regarding Configuration of Information Processing Apparatus

Next, description will be given on a hardware configuration example of each of information processing apparatuses forming an information processing system of the present disclosure with reference to FIG. 19 and the following figure.

Figure 19:
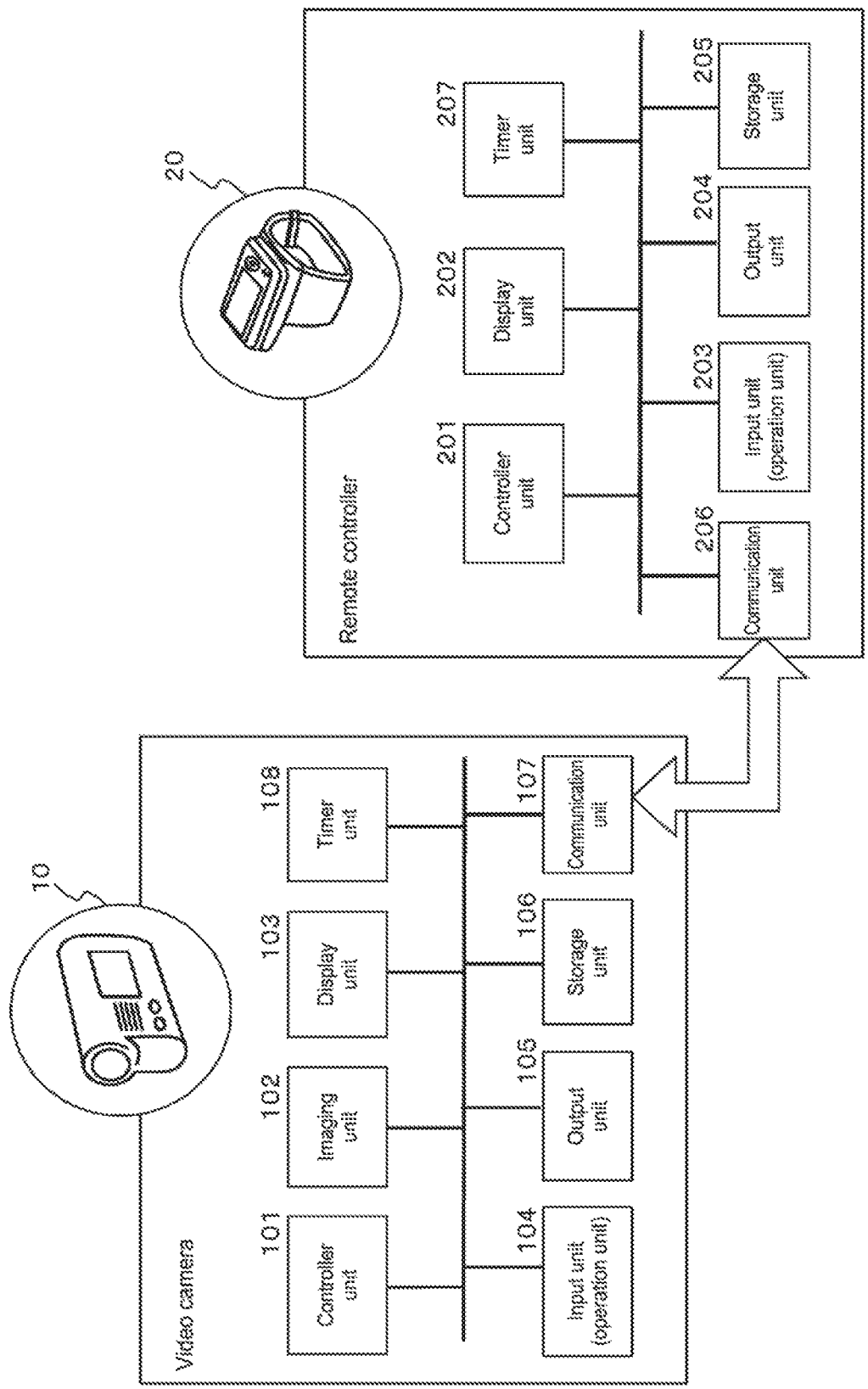
FIG. 19 is a diagram for describing configuration examples of the video camera and the remote controller.

FIG. 19 is a block diagram showing a configuration example of the video camera 10 and the remote controller 20 shown in FIG. 1.

The video camera 10 includes a controller unit 101, an imaging unit 102, a display unit 103, an input unit (operation unit) 104, an output unit 105, a storage unit 106, a communication unit 107, and a timer unit 108.

The controller unit 101 executes control of data processing executed in the video camera 10, such as image capturing control, display control, data transmitting/receiving control, or mode change control. The controller unit 101 includes a CPU having a program execution function and executes processing or the like according to an application (program) stored in the storage unit 106.

Specifically, for example, the above-mentioned processing according to the sequence or the like is performed.

The imaging unit 102 is an imaging unit for image capturing and performs moving image capturing or still image capturing. In the image capturing processing, an image capturing start timing or stop timing is controlled under the control of the controller unit 101.

The display unit 103 is utilized for displaying information of a communication status with the remote controller 20, battery remaining amount information, and the like. Further, the display unit 103 can also be utilized for processing of displaying a captured image or of reading an image that has been captured from the storage unit 106 for display, and the like.

The input unit 104 is a user-operable input unit and is an input unit for performing various operation instructions or the like. A display unit in the form of a touch panel is also a part of the input unit.

The output unit 105 includes an output unit for image output, sound output, or other data with respect to an external apparatus. The display unit 103 is also one of constituent elements of the output unit 105.

The storage unit 106 includes a RAM, a ROM, another recoding medium, or the like. The storage unit 106 is utilized as a storage area for the captured image and also utilized as a storage area for an application program executed by the controller unit 101. Further, the storage unit 106 is also utilized as a storage area or a work area for parameters applied to the data processing executed by the controller unit 101 or the like.

The communication unit 107 is a communication unit utilized for communication processing with an external apparatus, e.g., the remote controller 20, and is utilized for data communication via various communication paths, such as wired communication using communication cables or the like, in addition to wireless communication such as Wi-Fi or Bluetooth (BT).

The example shown in FIG. 19 shows a communication path with a communication unit 206 of the remote controller 20.

As in the embodiment described above, various types of communication are executed via the communication units of those two apparatuses.

For example, the operation information or the like of the remote controller 20 is transmitted to the video camera 10, and the control of an image capturing start, an image capturing stop, or the like is performed by the video camera 10. Further, a command for transmission start or stop of the captured image or the like is transmitted from the remote controller 20 to the video camera 10, and the captured image is transmitted from the video camera 10 to the remote controller 20.

The timer unit 108 has, for example, in addition to a clock function showing current time information, a timer function of measuring an elapsed time from the image capturing start or the like. Further, the timer unit 108 is also utilized for measuring a period in which no operation information is input from the remote controller side.

The remote controller 20 includes a controller unit 201, a display unit 202, an input unit (operation unit) 203, an output unit 204, a storage unit 205, the communication unit 206, and a timer unit 207.

The controller unit 201 executes control of data processing executed in the remote controller 20, such as image display control, data transmitting/receiving control, analysis of operation information, or mode change control executed in the remote controller 20. The controller unit 201 includes a CPU having a program execution function and executes processing or the like according to an application (program) stored in the storage unit 205.

Specifically, for example, the above-mentioned processing according to the sequence or the like is performed.

The display unit 202 is utilized for, for example, as described above, displaying a captured image by the video camera 10, information of a communication status with the video camera 10, battery remaining amount information, and the like.

The input unit 203 is a user-operable input unit and is an input unit for performing various operation instructions or the like. A display unit in the form of a touch panel is also a part of the input unit.

The output unit 204 includes an output unit for image output, sound output, or other data with respect to an external apparatus. The display unit 202 is also one of constituent elements of the output unit 204.

The storage unit 205 includes a RAM, a ROM, another recoding medium, or the like. The storage unit 205 is utilized as a storage area for the captured image and also utilized as a storage area for an application program executed by the controller unit 201. Further, the storage unit 205 is also utilized as a storage area or a work area for parameters applied to the data processing executed by the controller unit 201 or the like.

The communication unit 206 is a communication unit utilized for communication processing with an external apparatus, e.g., the video camera 10, and is utilized for data communication via various communication paths, such as wired communication using communication cables or the like, in addition to wireless communication such as Wi-Fi or Bluetooth (BT).

The example shown in FIG. 19 shows a communication path with the communication unit 107 of the video camera 10.

As in the embodiment described above, various types of communication are executed via the communication units of those two apparatuses.

For example, the operation information or the like of the remote controller 20 is transmitted to the video camera 10, and control of an image capturing start, an image capturing stop, or the like is performed by the video camera 10. Further, a command for transmission start or stop of the captured image or the like is transmitted from the remote controller 20 to the video camera 10, and the captured image is transmitted from the video camera 10 to the remote controller 20.

The timer unit 207 has, for example, in addition to a clock function showing current time information, a timer function of measuring an elapsed time from the image capturing start or the like. Further, the timer unit 207 is also utilized for measuring a period in which no user operation is made on the remote controller 20.

Figure 20:
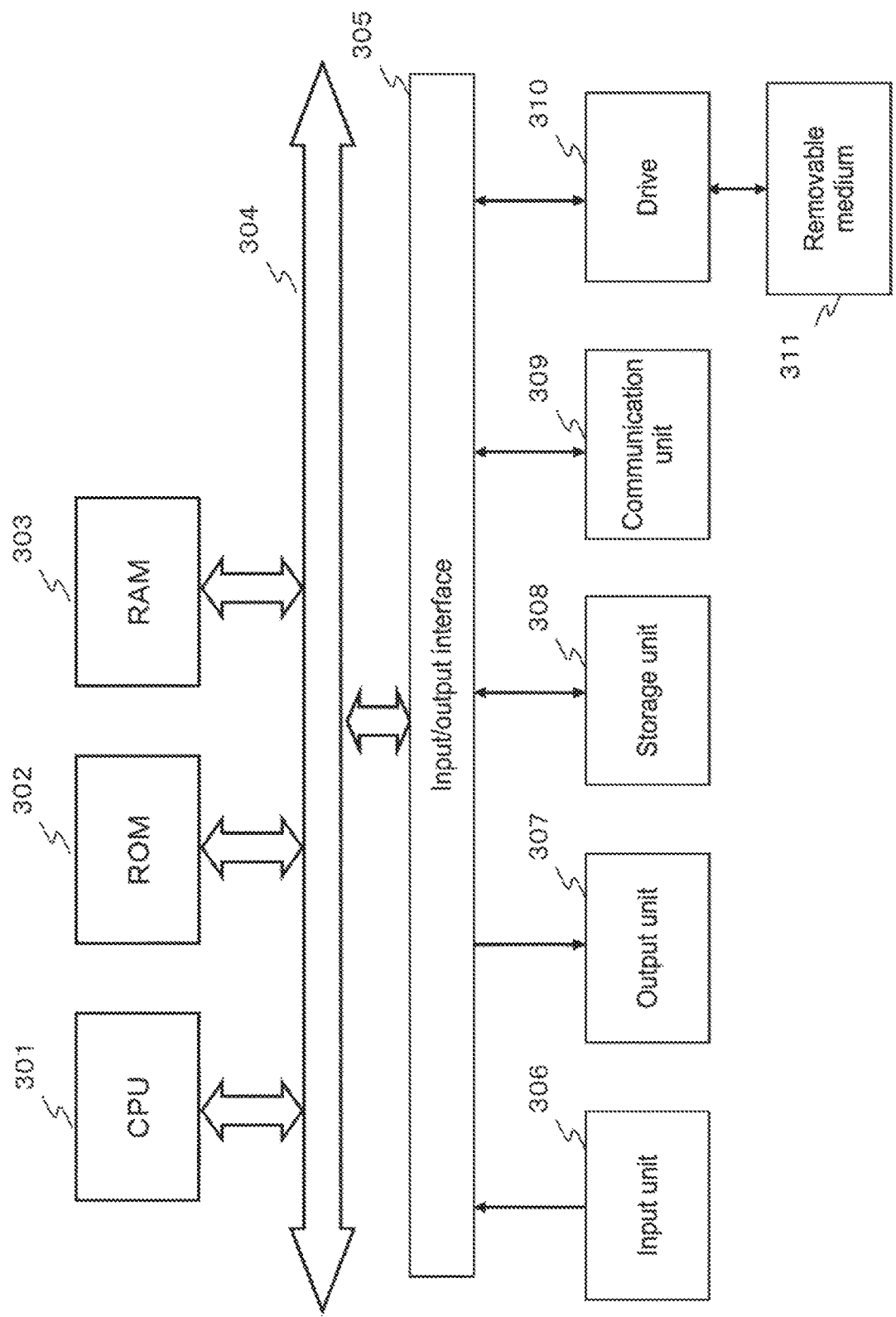
FIG. 20 is a diagram for describing a hardware configuration example of the remote controller or a PC.

FIG. 20 is a diagram showing a hardware configuration example of an information processing apparatus that is applicable as the remote controller 20 shown in FIG. 1 or the PC shown in FIG. 18.

A CPU (Central Processing Unit) 301 functions as a controller unit or a data processing unit that executes various types of processing according to a program stored in a ROM (Read Only Memory) 302 or a storage unit 308. For example, the CPU 301 executes processing conforming to the sequence described in the embodiment described above. A RAM (Random Access Memory) 303 stores programs executed by the CPU 301, data, or the like. Those CPU 301, ROM 302, and RAM 303 are connected to one another via a bus 304.

The CPU 301 is connected to an input/output interface 305 via the bus 304. An input unit 306 including various switches, a keyboard, a mouse, a microphone, and the like and an output unit 307 including a display, a speaker, and the like are connected to the input/output interface 305. The CPU 301 executes various types of processing so as to correspond to a command input from the input unit 306 and outputs a processing result to, for example, the output unit 307.

The storage unit 308 connected to the input/output interface 305 includes, for example, a hard disk, and stores programs executed by the CPU 301 or various types of data. A communication unit 309 functions as a transmission/reception unit for Wi-Fi communication, Bluetooth (BT) communication, or data communication via a network such as the Internet or a local area network and communicates with an external apparatus.

A drive 310 connected to the input/output interface 305 drives a removable medium 311 such as a magnetic disk, an optical disc, a magneto-optical disk, or a semiconductor memory, e.g., a memory card and executes data recording or reading.

11. Conclusion of Configuration of Present Disclosure

Hereinabove, the embodiment of the present disclosure has been described in detail with reference to a specific embodiment. However, it is obvious that modifications and substitutions can be made to the embodiment by those skilled in the art without departing from the gist of the present disclosure. In other words, the present invention has been disclosed as an illustrative form, and it should not be construed as limiting. To determine the gist of the present disclosure, the scope of claims should be considered.

Note that the technology disclosed in this specification can have the following configurations.

(1) An information processing apparatus, including:
a communication unit that communicates with an imaging apparatus;
an operation unit that inputs operation information for the imaging apparatus;
a display unit that displays an image; and
a controller unit that executes control of reception of a captured image from the imaging apparatus via the communication unit and display processing on the display unit, the controller unit controlling whether the captured image from the imaging apparatus is to be displayed on the display unit or not on the basis of an operation state of the operation unit during image capturing by the imaging apparatus.

(2) The information processing apparatus according to (1), in which
the controller unit performs display indicating that recording processing is in execution during a period in which the recording processing by the imaging apparatus is in execution, irrespective of presence or absence of the display processing of the captured image.

(3) The information processing apparatus according to (1) or (2), in which
the controller unit further interrupts part of a plurality of communication paths with the imaging apparatus when a period in which there is no operation on the operation unit reaches a second prescribed time.

(4) The information processing apparatus according to any one of (1) to (3), in which the communication unit is configured to execute processing of receiving the captured image from the imaging apparatus via a first communication path, and the controller unit stops the processing of receiving the captured image from the imaging apparatus via the first communication path when a period in which there is no operation on the operation unit reaches a first prescribed time.

(5) The information processing apparatus according to any one of (1) to (4), in which the communication unit is configured to execute communication with the imaging apparatus by using a first communication path and a second communication path, and the controller unit interrupts the first communication path with the imaging apparatus when a period in which there is no operation on the operation unit reaches a second prescribed time.

(6) The information processing apparatus according to any one of (1) to (5), in which the controller unit resumes, when an input of an image display instruction is detected during a period in which the reception of the captured image from the imaging apparatus and the display processing on the display unit are stopped, the reception of the captured image from the imaging apparatus and the display processing on the display unit.

(7) The information processing apparatus according to any one of (1) to (6), in which the controller unit resumes, when an input of an image display instruction is detected during a period in which a first communication path with the imaging apparatus is stopped, the first communication path with the imaging apparatus and also the reception of the captured image from the imaging apparatus via the first communication path and the display processing on the display unit.

(8) The information processing apparatus according to any one of (1) to (7), in which the controller unit displays valid operation unit identification information on the display unit, the valid operation unit identification information indicating an operation unit to which a user input is valid.

(9) The information processing apparatus according to (8), in which the controller unit displays more pieces of valid operation unit identification information in a non-display period in which the captured image is not displayed on the display unit than in a display period in which the captured image is displayed.

(10) The information processing apparatus according (8) or (9), in which the communication unit executes communication with the imaging apparatus by using a first communication path and a second communication path, the controller unit is configured to interrupt the first communication path with the imaging apparatus on the basis of a continuous state of a period in which there is no operation on the operation unit, and the controller unit displays the valid operation unit identification information on the display unit, the valid operation unit identification information corresponding to a valid operation unit that is changed on the basis of an available communication path with the imaging apparatus.

(11) The information processing apparatus according to any one of (8) to (10), in which the controller unit displays, during a period in which a first communication path with the imaging apparatus is stopped, the valid operation unit identification information regarding an operation unit on the display unit, the operation unit being capable of transmitting the operation information to the imaging apparatus via a second communication path.

(12) An information processing system, including:

an imaging apparatus; and a remote controller that executes control of the imaging apparatus, the remote controller controlling whether a captured image from the imaging apparatus is to be displayed on a display unit or not on the basis of an operation state of an operation unit of the remote controller during image capturing by the imaging apparatus.

(13) The information processing system according to (12), in which the remote controller further interrupts part of a plurality of communication paths with the imaging apparatus when a period in which there is no operation on the operation unit of the remote controller reaches a second prescribed time.

(14) The information processing system according to (12) or (13), in which the remote controller is configured to execute processing of receiving the captured image from the imaging apparatus via a first communication path, and the remote controller stops the processing of receiving the captured image from the imaging apparatus via the first communication path when a period in which there is no operation on the operation unit of the remote controller reaches a first prescribed time.

(15) The information processing system according to any one of (12) to (14), in which the remote controller is configured to execute communication with the imaging apparatus by using a first communication path and a second communication path, and the remote controller interrupts the first communication path with the imaging apparatus when a period in which there is no operation on the operation unit of the remote controller reaches a second prescribed time.

(16) The information processing system according to any one of (12) to (15), in which the remote controller displays valid operation unit identification information on the display unit of the remote controller, the valid operation unit identification information indicating an operation unit to which user input is valid.

(17) The information processing system according to any one of (12) to (16), in which the imaging apparatus displays one icon on a display unit of the imaging apparatus when both of a first communication path and a second communication path are available with the remote controller, the icon indicating that both of the first communication path and the second communication path are available.

(18) An imaging apparatus, including:

an imaging unit that executes image capturing;

a communication unit that selectively applies a plurality of different communication paths and executes communication with a remote controller; and a controller unit that interrupts part of the plurality of communication paths with the remote controller when an unoperated period in which there is no user operation on the remote controller reaches a prescribed time, the controller unit displaying one icon on the display unit when both of a first communication path and a second communication path are available with the remote controller, the icon indicating that both of the first communication path and the second communication path are available.

(19) An information processing method, which is executed by an information processing apparatus, the information processing apparatus including:

a communication unit that communicates with an imaging apparatus;

an operation unit that inputs operation information for the imaging apparatus;

a display unit that displays an image; and a controller unit that executes control of reception of a captured image from the imaging apparatus via the communication unit and display processing on the display unit, the controller unit controlling whether the captured image from the imaging apparatus is to be displayed on the display unit or not on the basis of an operation state of the operation unit during image capturing by the imaging apparatus.

(20) A program, which causes an information processing apparatus to execute information processing, the information processing apparatus including a communication unit that communicates with an imaging apparatus, an operation unit that inputs operation information for the imaging apparatus, a display unit that displays an image, and a controller unit that executes control of reception of a captured image from the imaging apparatus via the communication unit and display processing on the display unit, the program causing the controller unit to control whether the captured image from the imaging apparatus is to be displayed on the display unit or not on the basis of an operation state of the operation unit during image capturing by the imaging apparatus.

Further, the series of processing described in the specification can be executed by hardware, software, or a composite configuration of both of them. In a case where the processing is executed by software, a program recording a processing sequence can be installed in a memory of a computer incorporated in dedicated hardware and then executed, or can be installed in a general-purpose computer capable of executing various types of processing and then executed. For example, the program can be recorded in advance in a recording medium. The program can be not only installed in a computer from the recording medium, but also received via a network such as a LAN (Local Area Network) or the Internet and then installed in a recording medium such as a built-in hard disk.

Note that the various types of processing described in the specification may be executed not only in time series along the description, but also in parallel or individually on the basis of the processing capability of an apparatus that executes the processing or as needed. Further, in this specification, a system is a logical set configuration of a plurality of apparatuses and is not limited to one including the apparatuses having respective configurations in the same casing.

INDUSTRIAL APPLICABILITY

As described above, according to a configuration of one embodiment of the present disclosure, reduction in power consumption of the video camera and the remote controller that displays a captured image of the video camera, and improvement of operability are achieved.

Specifically, in the system including the video camera and the remote controller that displays a captured image of the video camera, when a period in which the operation unit of the remote controller is not operated reaches a first prescribed time, the processing of transmitting the captured image from the video camera to the remote controller via Wi-Fi communication and displaying the captured image on the display unit of the remote controller is stopped. Further, when a period in which the operation unit of the remote controller is not operated reaches a second prescribed time, the Wi-Fi communication is interrupted. Valid operation unit information in each mode is displayed on the display unit of the remote controller.

This configuration allows reduction in power consumption of the video camera and the remote controller that displays a captured image of the video camera and improvement of operability.

REFERENCE SIGNS LIST

10 video camera
11 display unit
20 remote controller
21 display unit
22 operation unit
31 mode set key operable state identification information
32 mode set key
33 recording start/stop key
34 recording/communication state display lamp
35 recording start/stop key operable state identification information
41 zoom set key operable state identification information
42 zoom set key
51, 52 communication state identification icon
70 video-camera-equipped capsule
80 PC
101 controller unit
102 imaging unit
103 display unit
104 input unit (operation unit)
105 output unit
106 storage unit
107 communication unit
108 timer unit
201 controller unit
202 display unit
203 input unit (operation unit)
204 output unit
205 storage unit
206 communication unit
207 timer unit
301 CPU
302 ROM
303 RAM
304 bus
305 input/output interface
306 input unit
307 output unit
308 storage unit
309 communication unit
310 drive
311 removable medium

The invention claimed is:

1. A non-transitory computer-readable medium having stored thereon computer-executable instructions that, when executed by a processor of an information processing apparatus, cause the processor to execute operations, the operations comprising:

communicating, via a communication unit of the information processing apparatus, with an image pickup apparatus via a communication path of a plurality of communication paths, wherein the plurality of communication paths includes a first communication path and a second communication path;

switching the information processing apparatus between a first communication state for communicating with the image pickup apparatus via the first communication path and a second communication state for communicating with the image pickup apparatus via the second communication path, wherein
 the information processing apparatus is switched during capturing an image by the image pickup apparatus, and
 the information processing apparatus is switched based on an operation of a touch panel-type operation unit of the information processing apparatus; and
displaying, on a display unit of the information processing apparatus, recording start/stop key operable state identification information in the first communication state and the second communication state.

2. The non-transitory computer-readable medium according to claim 1, wherein the operation of the touch panel-type operation unit corresponds to an image display instruction.

3. The non-transitory computer-readable medium according to claim 1, further comprising displaying, on the display unit, image quality information of the captured image.

4. The non-transitory computer-readable medium according to claim 1, further comprising displaying, on the display unit, communication state information of the information processing apparatus and battery state information of the image pickup apparatus.

5. The non-transitory computer-readable medium according to claim 1, further comprising displaying, on the display unit, recording processing execution state information and recording processing stop state information.

6. The non-transitory computer-readable medium according to claim 1, wherein the second communication state corresponds to a state in which the information processing apparatus is configured to communicate with the image pickup apparatus via the first communication path and the second communication path.

7. The non-transitory computer-readable medium according to claim 1, wherein the first communication path corresponds to a Bluetooth communication path.

8. The non-transitory computer-readable medium according to claim 1, wherein the second communication path corresponds to a Wi-Fi communication path.

9. The non-transitory computer-readable medium according to claim 1, further comprising switching the information processing apparatus from the second communication state to the first communication state by stopping communication via the second communication path.

10. An information processing method, comprising:
in an information processing apparatus:
communicating, via a communication unit of the information processing apparatus, with an image pickup apparatus via a communication path of a plurality of communication paths, wherein the plurality of communication paths includes a first communication path and a second communication path;
switching the information processing apparatus between a first communication state for communicating with the image pickup apparatus via the first communication path and a second communication state for communicating with the image pickup apparatus via the second communication path, wherein
 the information processing apparatus is switched during capturing an image by the image pickup apparatus, and
 the information processing apparatus is switched based on an operation of a touch panel-type operation unit of the information processing apparatus; and
displaying, on a display unit of the information processing apparatus, recording start/stop key operable state identification information in the first communication state and the second communication state.

11. The method according to claim 10, wherein the operation of the touch panel-type operation unit corresponds to an image display instruction.

12. The method according to claim 10, further comprising displaying, on the display unit, image quality information of the captured image.

13. The method according to claim 10, further comprising displaying, on the display unit, communication state information of the information processing apparatus and battery state information of the image pickup apparatus.

14. The method according to claim 10, further comprising displaying, on the display unit, recording processing execution state information and recording processing stop state information.

15. The method according to claim 10, wherein the second communication state corresponds to a state in which the information processing apparatus is configured to communicate with the image pickup apparatus via the first communication path and the second communication path.

16. The method according to claim 10, wherein the first communication path corresponds to a Bluetooth communication path.

17. The method according to claim 10, wherein the second communication path corresponds to a Wi-Fi communication path.

18. The method according to claim 10, further comprising switching the information processing apparatus from the second communication state to the first communication state by stopping communication via the second communication path.

19. A non-transitory computer-readable medium having stored thereon computer-executable instructions that, when executed by a processor of an information processing apparatus, cause the processor to execute operations, the operations comprising:
communicating, via a communication unit of the information processing apparatus, with an image pickup apparatus via a communication path of a plurality of communication paths, wherein the plurality of communication paths includes a first communication path and a second communication path;
starting to switch the information processing apparatus, based on an operation of a touch panel-type operation unit of the information processing apparatus, between a first communication state and a second communication state during capturing an image by the image pickup apparatus, wherein
 the first communication state corresponds to a state at which the information processing apparatus is configured to communicate with the image pickup apparatus via the first communication path, and
 the second communication state corresponds to a state at which the information processing apparatus is configured to communicate with the image pickup apparatus via the second communication path; and
displaying, on a display unit of the information processing apparatus, recording start/stop key operable state identification information for the image pickup apparatus in the first communication state and the second communication state.

20. An information processing method, comprising:

in an information processing apparatus:

communicating, via a communication unit of the information processing apparatus, with an image pickup apparatus via a communication path of a plurality of communication paths, wherein the plurality of communication paths includes a first communication path and a second communication path;

starting to switch the information processing apparatus, based on an operation of a touch panel-type operation unit of the information processing apparatus, between a first communication state and a second communication state during capturing an image by the image pickup apparatus, wherein the first communication state corresponds to a state at which the information processing apparatus is configured to communicate with the image pickup apparatus via the first communication path, and the second communication state corresponds to a state at which the information processing apparatus is configured to communicate with the image pickup apparatus via the second communication path; and displaying, on a display unit of the information processing apparatus, recording start/stop key operable state identification information for the image pickup apparatus in the first communication state and the second communication state.

* * * * *